(12) United States Patent
Grossmann et al.

(10) Patent No.: US 12,177,834 B2
(45) Date of Patent: Dec. 24, 2024

(54) METHODS AND APPARATUSES FOR SIGNALING FRAMEWORK FOR FLEXIBLE BEAM MANAGEMENT

(71) Applicant: Fraunhofer-Gesellschaft zur Förderung der angewandten Forschung e.V., Munich (DE)

(72) Inventors: Marcus Grossmann, Erlangen (DE); Sutharshun Varatharaajan, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 18/028,320

(22) PCT Filed: Sep. 20, 2021

(86) PCT No.: PCT/EP2021/075801
§ 371 (c)(1),
(2) Date: Mar. 24, 2023

(87) PCT Pub. No.: WO2022/063722
PCT Pub. Date: Mar. 31, 2022

(65) Prior Publication Data
US 2023/0262693 A1     Aug. 17, 2023

(30) Foreign Application Priority Data

Sep. 28, 2020    (EP) .................................... 20198747

(51) Int. Cl.
*H04W 72/21*     (2023.01)
*H04L 5/00*     (2006.01)
(Continued)

(52) U.S. Cl.
CPC ....... *H04W 72/1268* (2013.01); *H04L 5/0051* (2013.01); *H04W 72/21* (2023.01); *H04W 72/23* (2023.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

2022/0116882 A1*   4/2022   Guo .................... H04W 52/146
2022/0295417 A1*   9/2022   Sun ..................... H04W 52/146
(Continued)

OTHER PUBLICATIONS

International Search Report and the Written Opinion of the International Searching Authority, or the Declaration, Nov. 16, 2021, Application No. PCT/EP2021/075801, European Patent Office.
(Continued)

*Primary Examiner* — Bo Hui A Zhu
(74) *Attorney, Agent, or Firm* — Burr & Forman LLP

(57) ABSTRACT

The methods and apparatuses for signaling framework for flexible beam management in a wireless communications network. A method performed by a UE comprises: receiving, from a network node, via a higher layer, a configuration of at least one information element (IE), said configuration comprising at least: an identifier (ID) unique to each IE and ID(s) of one or more uplink (UL) resource(s) and/or downlink (DL) resource(s) that is/are used to indicate at least a spatial filter or beam direction for transmission of at least a Physical Uplink Shared Channel (PUSCH) resource and/or a Physical Uplink Control Channel (PUCCH) resource, and/or a Sounding reference Signal (SRS) resource; and applying the configuration provided in the at least one IE for the transmission of the PUSCH resource, and/or the PUCCH resource and/or the SRS resource. There is also provided a
(Continued)

method performed by a network node, a UE and a network node.

13 Claims, 5 Drawing Sheets

(51) Int. Cl.
*H04W 72/1268* (2023.01)
*H04W 72/23* (2023.01)

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | | |
|---|---|---|---|---|
| 2022/0345272 A1* | 10/2022 | Guo | ...................... | H04W 72/20 |
| 2023/0164699 A1* | 5/2023 | Yuan | ................... | H04W 52/226 455/522 |
| 2023/0171771 A1* | 6/2023 | Guo | ...................... | H04W 16/28 370/329 |

OTHER PUBLICATIONS

International Preliminary Report on Patentability, Dec. 8, 2022, Application No. PCT/EP2021/075801, European Patent Office.
3GPP TSG RAN WG1 #102-3, e-Meeting, Aug. 17-28, 2020, R1-2007189, Moderator Summary #2 for Multi-Beam Enhancement: Proposal Categorization.
3GPP TSG RAN WG1 #102-e, e-Meeting, Spreadtrm Communications, Aug. 17-28, 2020, R1-2006248, Enhancements on Multi-Beam Operation.
3GPP TSG RAN Meeting #89e, Electronic Meeting, Sep. 14-18, 2020, RP-201469, Status Report to TSG.
Office Action issued by European Patent Office, Jan. 29, 2024, European Application No. 21 782 482.0-1215, Stockholm, Sweden.
3GPP TSG-RAN WG1 Meeting #102-e, e-meeting, Aug. 17-28, 2020—Tdoc R1-2005842, Agenda Item 8.1.1, Ericsson, Enhancements to multi-beam operation.
3GPP TSG-RAN WG1 Meeting #98, Prague, Czech Republic, Aug. 26-30, Tdoc R1-1909225, Enhancements to Multibeam Operation, Ericsson, Agenda Item 7.2.8.3.
3GPP TSG RAN WG1 #102-e, e-meeting, Aug. 17-28, 2020, R1-2007189, Moderator Summary #2 for Mutli-Beam Enhancement: Proposal Categorization, Samsung.
3GPP TSG RAN WG1 #102-3, e-Meeting, Aug. 17-28, 2020, R1-2006248, Agenda Item 8.1.1, Enhancements on Multi-Beam Operation , Spreadtrum Communications.

* cited by examiner

METHODS AND APPARATUSES FOR SIGNALING FRAMEWORK FOR FLEXIBLE BEAM MANAGEMENT

CROSS-REFERENCE TO RELATED APPLICATION

This application is a national stage application, filed under 35 U.S.C. § 371, of International Patent Application No. PCT/EP2021/075801 filed on Sep. 20, 2021, and European Patent Application EP20198747.6 filed on Sep. 28, 2020, which are incorporated by reference herein in their entirety.

TECHNICAL FIELD

The present disclosure relates to the field of wireless communications, and in particular to methods and apparatuses for signaling framework for flexible beam management in a wireless communications network such as advanced 5G networks.

BACKGROUND

The fifth generation (5G) mobile communications system also known as new radio (NR) provides a higher level of performance than the previous generations of mobile communications system. 5G mobile communications has been driven by the need to provide ubiquitous connectivity for applications as diverse automotive communication, remote control with feedback, video downloads, as well as data applications for Internet-of-Things (IoT) devices, machine type communication (MTC) devices, etc. 5G wireless technology brings several main benefits, such as faster speed, shorter delays and increased connectivity. The third-generation partnership project (3GPP) provides the complete system specification for the 5G network architecture, which includes at least a radio access network (RAN), core transport networks (CN) and service capabilities.

FIG. 1 illustrates a simplified schematic view of an example of a wireless communications network 100 including a core network (CN) 110 and a radio access network (RAN) 120. The RAN 120 is shown including a plurality of network nodes or radio base stations, which in 5G are called gNBs. Three radio base stations are depicted gNB1, gNB2 and gNB3. Each gNB serves an area called a coverage area or a cell. FIG. 1 illustrates 3 cells 121, 122 and 123, each served by its own gNB, gNB1, gNB2 and gNB3 respectively. It should be mentioned that the network 100 may include any number of cells and gNBs. The radio base stations, or network nodes serve users within a cell. In 4G or LTE, a radio base station is called an eNB, in 3G or UMTS, a radio base station is called an eNodeB, and BS in other radio access technologies. A user or a user equipment (UE) may be a wireless or a mobile terminal device or a stationary communication device. A mobile terminal device or a UE may also be an IoT device, an MTC device, etc. IoT devices may include wireless sensors, software, actuators, and computer devices. They can be imbedded into mobile devices, motor vehicle, industrial equipment, environmental sensors, medical devices, aerial vehicles and more, as well as network connectivity that enables these devices to collect and exchange data across an existing network infrastructure.

Referring back to FIG. 1, each cell is shown including UEs and IoT devices. gNB1 in cell 121 serves UE1 121A, UE2 121B and IoT device 121C. Similarly, gNB2 in cell 121 serves UE3 122A, UE4 122B and IoT device 122C, and gNB3 in cell 123 serves UE5 123A, UE6 123B and IoT device 123C. The network 100 may include any number of UEs and IoT devices or any other types of devices. The devices communicate with the serving gNB(s) in the uplink and the gNB(s) communicate with the devices in the downlink. The respective base station gNB1 to gNB3 may be connected to the CN 120, e.g. via the S1 interface, via respective backhaul links 111, 121D, 122D, 123D, which are schematically depicted in FIG. 1 by the arrows pointing to "core". The core network 120 may be connected to one or more external networks, such as the Internet. The gNBs may be connected to each other via the S1 interface or the X2 interface or the XN interface in 5G, via respective interface links 121E, 122E and 123E, which is depicted in the figure by the arrows pointing to gNBs.

For data transmission, a physical resource grid may be used. The physical resource grid may comprise a set of resource elements (REs) to which various physical channels and physical signals are mapped. For example, the physical channels may include the physical downlink, uplink and/or sidelink (SL) shared channels (PDSCH, PUSCH, PSSCH) carrying user specific data, also referred to as downlink, uplink or sidelink payload data, the physical broadcast channel (PBCH) carrying for example a master information block (MIB) and a system information block (SIB), the physical downlink, uplink and/or sidelink control channels (PDCCH, PUCCH, PSCCH) carrying for example the downlink control information (DCI), the uplink control information (UCI) or the sidelink control information (SCI). For the uplink, the physical channels may further include the physical random-access channel (PRACH or RACH) used by UEs for accessing the network once a UE is synchronized and obtains the MIB and SIB. The physical signals may comprise reference signals (RS), synchronization signals (SSs) and the like. The resource grid may comprise a frame or radio frame having a certain duration, like 10 milliseconds, in the time domain and having a given bandwidth in the frequency domain. The radio frame may have a certain number of subframes of a predefined length, e.g., 2 subframes with a length of 1 millisecond. Each subframe may include two slots of a number of OFDM symbols depending on the cyclic prefix (CP) length. IN 5G, each slot consists of 14 OFDM symbols or 12 OFDM symbols based on normal CP and extended CP respectively. A frame may also consist of a smaller number of OFDM symbols, e.g. when utilizing shortened transmission time intervals (TTIs) or a mini-slot/non-slot-based frame structure comprising just a few OFDM symbols. Slot aggregation is supported in 5G NR and hence data transmission can be scheduled to span one or multiple slots. Slot format indication informs a UE whether an OFDM symbol is downlink, uplink or flexible.

The wireless communication network system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

The wireless communications network system depicted in FIG. 1 may be a heterogeneous network having two distinct overlaid networks, a network of macro cells with each macro cell including a macro base station, like base station gNB1 to gNB3, and a network of small cell base stations (not shown in FIG. 1), like femto- or pico-base stations. In addition to the above described wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, standard.

In 3GPP NR i.e. 5G, and its further releases [1-6], downlink (DL) channel state information (CSI) reporting by a UE to a network node (for e.g., a gNodeB, gNB) aids the scheduling of the physical downlink shared channel (PDSCH). Downlink reference signals (RSs) such as the channel state information reference signal (CSI-RS) and the synchronization signal/physical broadcast channel (SS/PBCH) block (SSB), which can be referred to as CSI resources, are used to evaluate the link between the UE and the network node, and the UE provides CSI feedback to the network node on the physical uplink control channel (PUCCH) or the physical uplink shared channel (PUSCH), wherein the CSI is obtained from measurements of the reference signals.

In millimeter wave (mmWave) frequencies (frequency range 2 (FR2)), i.e., frequencies above 6 GHz, in general, wireless communication between communication devices is performed with spatially selective/directive transmissions and receptions called beams. Therefore, beam management is a required framework for link establishment, adaptation, and recovery at FR2.

In the 3GPP Rel. 16, beam management in UL is handled separately for various UL channels and UL reference signals. The functionalities of the UL beam management framework are spread over three communication layers—the physical (PHY) layer [1-4], the medium access control (MAC) layer [5] and the Radio Resource Control (RRC) layer [6]. In order to enable a beamformed uplink transmission between a UE and a radio network node (e.g. gNB), the beam management performs two tasks: Indication of the beam direction for the UL transmission, and indication of the transmit power settings associated with it. The two tasks are handled in different ways for the PUSCH, the PUCCH and the sounding reference signal (SRS).

On the other hand, in the downlink (DL), the UE must be given directives to derive various parameters such as delay spread, average delay, Doppler and Receiver (Rx) beam direction for the reception of a DL channel or reference signal (RS).

The term 'beam' is used in the following to denote a spatially selective/directive transmission of an outgoing signal or reception of an incoming signal which is achieved by precoding/filtering the signal at the antenna ports of the device with a particular set of coefficients. The words precoding or filtering may refer to processing of the signal in the analog or digital domain. The set of coefficients used to spatially direct a transmission/reception in a certain direction may differ from one direction to another direction. The term 'Tx beam' denotes a spatially selective/directive transmission and the term 'Rx beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

In case of the UE, the 'spatial relation' for an UL channel 'Uc' or RS 'Ur' with respect to or with reference to a DL or UL RS 'R' means that the UE uses the spatial filter used to receive or transmit the RS 'R' to transmit the UL channel 'Uc' or RS 'Ur', or it means that the UE uses the spatial filter used to receive or transmit the RS 'R' as a reference to determine the spatial filter used to transmit the UL channel 'Uc' or RS 'Ur'.

The term 'higher layer' in the following, when used in isolation, denotes any communication layer above the physical layer in the protocol stack.

The term serving cell and carrier component (CC) may be used interchangeably in this disclosure as a serving cell configured for a UE and is usually a separate physical carrier centered around a particular carrier frequency. Depending on the frequency of a component carrier/serving cell, the size of the cell and the beamformed reference signals may vary.

In the following, the state of the art (SoTA) for UL and DL beam management, pathloss reference signals (RSs) and power control in 3GPP is discussed. This is followed by a short description of the deficiencies in the current framework of the same along with solutions to address them.

Downlink Transmission Configuration Indication (DL-TCI)

The physical downlink control channel (PDCCH) and the physical downlink shared channel (PDSCH) carry DL control information (DCI) and DL data, respectively, to a UE [1-6].

Demodulation reference signals (DMRS) are embedded for the coherent demodulation of the PDCCH/PDSCH at the UE. The DMRS consists of a set of DMRS ports. The number of DMRS ports determines the number of transmission layers contained in a PDSCH. DMRS is used for channel estimation at the UE to coherently demodulate the PDSCH or PDCCH(s). In the case of PDCCH, one or more of them may be transmitted on a CORESET. Therefore, the DMRS for the coherent demodulation of the PDCCH(s) on the Control Resource Set (CORESET) may be embedded across the PDCCH(s) transmitted on the CORESET.

A parameter in the transmission of the PDCCH and the PDSCH is the 'Transmission Configuration Indication'-state (TCI-state) [4]. In 3GPP Rel. 16, the indication of how the control or the shared channel is transmitted by the gNB and what assumptions the UE must consider while receiving them, is done via reference signals (RSs). The indication to the UE is performed using a TCI-state information element (IE) configured via RRC. A TCI-state IE, among others, consists of the following elements:

One of more reference signal(s), and
for each reference signal, one or more quasi-colocation (QCL) assumptions.

The TCI-state is used to mention or indicate how to receive a PDSCH or the PDCCH(s) transmitted on a CORESET. Applying a TCI-state to a PDSCH or CORESET implies that the DMRS ports of the PDSCH or the DMRS ports of the PDCCH(s), transmitted on the CORESET, shall be assumed to be quasi-co-located with the reference signals mentioned or indicated in the TCI-state.

Assuming 'quasi-colocation' means that certain channel parameters such as Doppler shift/spread, delay spread, average delay and/or Tx beam direction are assumed to be the same for the RS mentioned in the TCI-state and the DMRS ports of the PDSCH, or the DMRS ports of the PDCCH(s) transmitted on the CORESET. Four different QCL types can be indicated in 3GPP Rel. 16 [4].

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

One or more of the QCL-Info parameter(s) is/are included in the TCI-state IE to provide the QCL assumption(s) associated with the TCI-state.

For example, a TCI-state IE comprising a DL reference signal (RS) 'A' with QCL assumption 'QCL-typeA' and a DL RS 'B' with QCL-assumption 'QCL-TypeD' is considered. Applying this TCI-state to a PDSCH or CORESET with the given quasi-colocation assumptions means that the UE may assume the same Doppler shift, Doppler spread, average delay and delay spread for the PDSCH or the PDCCH(s) transmitted on the CORESET and DL RS A, and the UE may use the same spatial filter to receive the DL RS 'B' and the PDSCH or the PDCCH(s) transmitted on the CORESET, or the Rx spatial filter to receive the PDCCH(s) on the CORESET or the PDSCH may be obtained from or be similar to that used for the reception of the DL RS 'B'.

Usually, the TCI state that is used to schedule a PDCCH or a PDSCH contains the identifiers (IDs) of channel state information reference signals (CSI-RS) or synchronization signal blocks (SSB) along with the QCL assumptions for the reference signal. The RS in the TCI-state is usually a RS that the UE has measured before, so that it can use it as a reference to receive the DMRS of the PDCCH or PDSCH, and hence demodulate the same. The indication of a TCI-state for a CORESET or a PDSCH is performed via Medium Access Control-Control Element (MAC-CE) messages or using the TCI-indication field in the downlink control information (DCI) used to schedule the PDSCH.

In FR2, where the gNB and UE establish a connection via spatially selective/directive beams, the TCI-state is used to indicate the Rx beams in which the UE may receive, i.e., the spatial filter that may be used by the UE to receive a PDSCH/PDCCH(s) via a 'qcl-TypeD' assumption with a CSI-RS or an SSB that the UE has received. The determination of the DL Tx beam to transmit PDCCH(s)/PDSCH is performed via a beam sweeping procedure by the network node (e.g., the gNB). In a beam sweeping procedure, the gNB configures a set of DL RSs (CSI-RS or SSB) via RRC for the UE to measure the set of DL RSs. Each of the configured DL RS may be transmitted with a different spatial filter, i.e., each of the configured DL RS may be transmitted in a different direction by the gNB. The UE measures each of the configured DL RS by receiving them using one or more spatial filters—the RSs may all be received with the same spatial filter or a different spatial filter may be used to receive each RS. Following the measurements, the UE sends a beam report to the gNB. The beam report comprises the indices of $1 \leq L \leq 4$ configured DL RSs (essentially, L DL Tx beam directions, with each beam direction resulting from the use of a specific spatial filter at the gNB) along with the received power in each of the RSs [4]. With the help of the beam report, the gNB determines one or more suitable DL Tx beam direction(s), i.e., spatial filter(s) for the transmission of the PDCCH(s) and the PDSCH.

Physical Uplink Shared Channel (PUSCH)

The PUSCH transmission(s) from a UE can be dynamically scheduled by a network node via an UL grant indicated in the PDCCH or semi-persistently/statically scheduled with the higher layer configured grant configuredGrantConfig. The configured grant Type 1 PUSCH transmission is semi-statically configured to operate upon the reception of a higher layer parameter of configuredGrantConfig including rrc-ConfiguredUplinkGrant without the detection of an UL grant in the PDCCH. The configured grant Type 2 PUSCH transmission is semi-persistently scheduled by an UL grant in a valid activation PDCCH [3] after the reception of the higher layer parameter configuredGrantConfig not including rrc-ConfiguredUplinkGrant [4].

The higher layer configurations of the PUSCH and the configuredGrantConfig according to the New Radio (NR) specifications [6] are shown in the following configurations:

| Higher Layer configuration of the PUSCH (SoTA) | | |
|---|---|---|
| PUSCH-Config ::= | SEQUENCE { | |
| dataScramblingIdentityPUSCH | INTEGER (0..1023) | OPTIONAL, -- Need S |
| txConfig | ENUMERATED {codebook, nonCodebook} | OPTIONAL, -- Need S |
| dmrs-UplinkForPUSCH-MappingTypeA | SetupRelease { DMRS-UplinkConfig } | OPTIONAL, -- Need M |
| dmrs-UplinkForPUSCH-MappingTypeB | SetupRelease { DMRS-UplinkConfig } | OPTIONAL, -- Need M |
| pusch-PowerControl | PUSCH-PowerControl | OPTIONAL, -- Need M |
| frequencyHopping | ENUMERATED {intraSlot, interSlot} | OPTIONAL, -- Need S |
| frequencyHoppingOffsetLists | SEQUENCE (SIZE (1..4)) OF INTEGR (1.. maxNrofPhysicalResourceBlocks−1) | |
| | | OPTIONAL, -- Need M |
| resourceAllocation | ENUMERATED { resourceAllocationType0, resourceAllocationType1, dynamicSwitch}, | |
| pusch-TimeDomainAllocationList | SetupRelease { PUSCH-TimeDomainResourceAllocationList } | OPTIONAL, -- Need M |
| pusch-AggregationFactor | ENUMERATED { n2, n4, n8 } | OPTIONAL, -- Need S |
| mcs-Table | ENUMERATED {qam256, qam64LowSE} | OPTIONAL, -- Need S |
| mcs-TableTransformPrecoder | ENUMERATED {qam256, qam64LowSE} | OPTIONAL, -- Need S |
| transformPrecoder | ENUMERATED {enabled, disabled} | OPTIONAL, -- Need S |
| codebookSubset | ENUMERATED {fullyAndPartialAndNonCoherent, partialAndNonCoherent,nonCoherent} | |
| | | OPTIONAL, -- Cond codebookBased |
| maxRank | INTEGER (1..4) | OPTIONAL, -- Cond codebookBased |
| rbg-Size | ENUMERATED { config2} | OPTIONAL, -- Need S |
| uci-OnPUSCH | SetupRelease { UCI-OnPUSCH} | OPTIONAL, -- Need M |
| tp-pi2BPSK | ENUMERATED {enabled} | OPTIONAL, -- Need S |
| ... | | |
| } | | |

| Higher configuration of configuredGrantConfig (SoTA) |
| --- |

```
ConfiguredGrantConfig ::=          SEQUENCE {
  frequencyHopping                   ENUMERATED {intraSlot, interSlot}                OPTIONAL, -- Need S
  cg-DMRS-Configuration              DMRS-UplinkConfig,
  mcs-Table                          ENUMERATED {qam256, qam64LowSE}                  OPTIONAL, -- Need S
  mcs-TableTransformPrecoder         ENUMERATED {qam256, qam64LowSE}                  OPTIONAL, -- Need S
  uci-OnPUSCH                        SetupRelease { CG-UCI-OnPUSCH }                  OPTIONAL, -- Need M
  resourceAllocation                 ENUMERATED { resourceAllocationType0, resourceAllocationType1, dynamicSwitch },
  rbg-Size                           ENUMERATED {config2}                             OPTIONAL, -- Need S
  powerControlLoopToUse              ENUMERATED {n0, n1},
  p0-PUSCH-Alpha                     P0-PUSCH-AlphaSetId,
  transformPrecoder                  ENUMERATED {enabled, disabled}                   OPTIONAL, -- Need S
  nrofHARQ-Processes                 INTEGER(1..16),
  repK                               ENUMERATED {n1, n2, n4, n8},
  repK-RV                            ENUMERATED {s1-0231, s2-0303, s3-0000}           OPTIONAL, -- Need R
  periodicity                        ENUMERATED {
                                       sym2, sym7, sym1x14, sym2x14, sym4x14, sym5x14, sym8x14,
                                       sym10x14, sym16x14, sym20x14,
                                       sym32x14, sym40x14, sym64x14, sym80x14, sym128x14, sym160x14,
                                       sym256x14, sym320x14, sym512x14,
                                       sym640x14, sym1024x14, sym1280x14, sym2560x14, sym5120x14,
                                       sym6, sym1x12, sym2x12, sym4x12, sym5x12, sym8x12, sym10x12,
                                       sym16x12, sym20x12, sym32x12,
                                       sym40x12, sym64x12, sym80x12, sym128x12, sym160x12, sym256x12,
                                       sym320x12, sym512x12, sym640x12,
                                       sym1280x12, sym2560x12
  },
  configuredGrantTimer               INTEGER (1..64)                                  OPTIONAL, -- Need R
  rrc-ConfiguredUplinkGrant          SEQUENCE {
    timeDomainOffset                   INTEGER (0..5119),
    timeDomainAllocation               INTEGER (0..15),
    frequencyDomainAllocation          BIT STRING (SIZE(18)),
    antennaPort                        INTEGER (0..31),
    dmrs-SeqInitialization             INTEGER (0..1)                                 OPTIONAL, -- Need R
    precodingAndNumberOfLayers         INTEGER (0..63),
    srs-ResourceIndicator              INTEGER (0..15)                                OPTIONAL, -- Need R
    mcsAndTBS                          INTEGER (0..31),
    frequencyHoppingOffset             INTEGER (1.. maxNrofPhysicalResourceBlocks-1)  OPTIONAL, -- Need R
    pathlossReferenceIndex             INTEGER (0..maxNrofPUSCH-PathlossReferenceRSs-1),
    ...,
    [[
    pusch_RepTypeIndicator-r16         ENUMERATED {pusch-RepTypeA,puschRepTypeB}      OPTIONAL, -- Need M
    frequencyHoppingPUSCH-             ENUMERATED {interRepitition, InterSlot}        OPTIONAL, -- Cond RepTypeB
      RepTypeB-r16
    timeReferenceSPS-r16               ENUMERATED {sfc512}                            OPTIONAL, -- Need S
    ]]
  }                                                                                   OPTIONAL, -- Need R
  ...,
}
```

The mode of transmission of the PUSCH is determined by the higher layer parameter 'txConfig'. The parameter can be set to either 'codebook' or 'nonCodebook' or it may not be configured. When the PUSCH is scheduled via the PDCCH, two different downlink control information (DCI) formats may be used in the scheduling-PDCCH-DCI format 0_0 or DCI format 0_1. The codebook- and non-codebook-based PUSCH transmissions are scheduled using DCI format 0_1 [4], when scheduled via the PDCCH. When scheduling the PUSCH using DCI format 0_1, the gNB indicates the ports from which the UE has to transmit via the SRS resource indicator (SRI). The SRI field in DCI format 0_1 indicates one or more SRS resource(s) from a codebook or non-codebook SRS resource set, which means that the UE must transmit the PUSCH via the SRS ports associated with the SRS resources indicated via the SRI.

In the case of codebook-based-PUSCH, the precoding of the ports for the PUSCH transmission is indicated via the scheduling PDCCH. In the non-codebook case, the precoding of the ports for the PUSCH transmission is either predetermined or left for UE implementation [1-4]. It is also possible that the PUSCH scheduled via a PDCCH using DCI format 0_1 may not contain an SRI field—it happens when the SRS resource set that the SRI uses to indicate the ports to transmit the PUSCH from contains only one SRS resource. For a codebook or non-codebook-based PUSCH scheduled via a higher layer grant, the SRI is indicated by the scheduling grant, when applicable. When 'txConfig' is not configured, the UE does not expect the PUSCH to be scheduled using DCI format 0_1. When the PUSCH is scheduled with DCI format 0_0, the UE uses a single port for the PUSCH transmission [4].

The beam direction or spatial relation of the PUSCH is determined from the beam direction/spatial relation of an SRS or a PUCCH resource depending on the mode of PUSCH transmission:

Codebook- or non-codebook-based PUSCH transmission is indicated with an SRS resource. The UE sounds the UL channel with SRS resources (which are configured specifically for the codebook/non-codebook transmission mode) and the gNB, in return, schedules the PUSCH via the indication of an SRS resource. The UE, thereby, transmits the PUSCH from the same ports from which the SRS resource was transmitted and uses the same beam direction/spatial relation for the transmission of the PUSCH as for the transmission of the SRS resource.

When the UE is scheduled by DCI format 0_0 (single-port PUSCH), the spatial relation used for the transmission of the PUSCH is the same as that used for the transmission of the PUCCH resource with the lowest ID in the currently active UL bandwidth part (BWP).

The pathloss reference RS, which is configured/indicated via a higher layer, is used in the power control settings of the PUSCH to determine the pathloss estimate for the transmission of the PUSCH [3]. The pathloss reference RS for the PUSCH is determined in different ways for different modes of PUSCH transmission. The PUSCH is configured with a list of pathloss reference RSs in 'PUSCH-PathlossReferenceRS' IEs and in most cases, it uses the list to obtain the pathloss reference RS.

For codebook- or non-codebook-based PUSCH transmission scheduled by the PDCCH, the pathloss reference RS is configured in 'SRI-PUSCH-PowerControl' IEs [6]. As previously presented, SRI stands for SRS Resource Indicator. These IEs contain the power control settings for the PUSCH such as the ID of a PUSCH-pathlossReferenceRS, 'alpha' values (pathloss compensation factor) and the closed loop power control index. The mapping between the PUSCH-pathlossReferenceRS IEs and the SRI-PUSCH-PowerControl IEs can be modified using Medium Access Control-Control Element (MAC-CE) messages [3]. The SRS resource indicator (SRI) mentioned for the codebook/non-codebook PUSCH transmission maps to a 'SRI-PUSCH-PowerControl' IE that provides these power control settings. When there is no SRI field in the scheduling PDCCH, the UE uses the SRI-PUSCH-PowerControl whose ID value is set to 0.

For single-port PUSCH (scheduled by the PDCCH via DCI format 0_0), the pathloss reference RS is obtained from the same PUCCH resource that it obtains the spatial relation from.

When the PUSCH is scheduled by a higher layer grant, the pathloss reference RS to be used is indicated via a pathlossReferenceIndex that points to a PUSCH-pathlossReferenceRS IE or is obtained from the SRI-PUSCH-PowerControl whose ID value is set to 0 when there is no SRS resource indicator field.

The transmit power of PUSCH is thereby determined from a combination of open loop and closed loop power control parameters. If a UE transmits a PUSCH on active UL BWP b of carrier f of serving cell c using parameter set configuration with index j and PUSCH power control adjustment state with index l, the UE determines the PUSCH transmission power in PUSCH transmission occasion i as:

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [dBm]$$

where, $P_{CMAX,\,f,c}(i)$ is the configured maximum UE transmit power defined in [7] and [8].

$P_{O\_PUSCH,b,f,c}(j)$ is a parameter composed of the sum of the nominal PUSCH transmission power $P_{O\_NOMINAL\_PUSCH,f,c}(j)$ and $P_{O\_UE\_PUSCH,b,f,c}(j)$ both of which are configured via a higher layer by the gNB [3].

$M_{RB,b,f,c}^{PUSCH}(i)$ is the bandwidth of the PUSCH resource assignment expressed in number of resource blocks.

$PL_{b,f,c}(q_d)$ is a downlink pathloss estimate in dB calculated by the UE using DL reference signal (RS) index $q_d$. The configuration/indication of the pathloss reference RS is as described above.

$\alpha_{b,f,c}(j)$ is a pathloss compensation factor configured via higher layer by the gNB.

$f_{b,f,c}(i, l)$ is a closed loop power correction function that changes depending on the transmit power control (TPC) feedback from the gNB.

$\Delta_{TF,b,f,c}(i)$ is a power offset value dependent on the modulation and coding scheme (MCS) used for the PUSCH.

In 3GPP Rel. 16, default spatial relations and pathloss reference RS assumptions were defined for UL channels/RSs, i.e., the 3GPP specification provides directives to identify the spatial relation and pathloss reference RS of an UL channel/RS in case they are not explicitly configured or indicated. In scenarios where beamformed transmissions are used (common in frequency range 2), the pathloss reference and the spatial relation may be derived from a downlink channel. This means the DL RS used as a reference to obtain the beam direction for receiving a DL channel (e.g., indicated via the TCI state) at the UE may be used as a reference to derive the spatial relation for an UL channel or UL RS and used in the calculation of the pathloss estimate for the Tx power calculation of the UL transmission.

Defining default spatial relations and pathloss reference RSs helps the network to avoid explicit indication of the parameters, especially in FR2 deployments, thereby reducing control information overhead and latency. In the case of PUSCH, the default assumptions in 3GPP Rel. 16 are obtained from a CORESET or from PUCCH resources configured on the CC (Component Carrier), depending on whether there are PUCCH resources configured on the CC or not [3], [4].

Sounding Reference Signal (SRS)

Sounding Reference Signals (SRSs), as the name suggests, are used for sounding the UL channel. The basic unit of the SRS is an SRS resource. An SRS resource is a specific pattern of reference symbols in time, frequency and code transmitted by all or a subset of UE's antenna ports in the UL to sound the UL channel. The UE is configured by the gNB via the RRC with one or more SRS resource sets, with each SRS resource set consisting of one or more SRS resources. The RRC information elements (IEs) that configure the SRS resource, SRS resource set and the SRS-SpatialRelationInfo are shown below [6].

As indicated in the SRS resource set configuration provided in below, the parameter 'usage' indicates the purpose for which the SRS is used:

1) Usage='codebook': to sound the UL channel before a codebook-based-PUSCH transmission.
2) Usage='non-codebook': to sound the UL channel before a non-codebook-based-PUSCH transmission.
3) Usage='beamManagement': to sound the UL channel with beamformed SRS resources to identify suitable UL beams.
4) Usage='antennaSwitching': to sound the UL channel to obtain DL channel information.

| SRS resource set configuration |
| --- |

```
SRS-ResourceSet ::=                     SEQUENCE {
  srs-ResourceSetId                       SRS-ResourceSetId,
  srs-ResourceIdList                      SEQUENCE (SIZE(1..maxNrofSRS-ResourcesPerSet))     OPTIONAL, -- Cond Setup
                                          OF SRS-ResourceId
  resourceType                            CHOICE {
    aperiodic                               SEQUENCE {
      aperiodicSRS-ResourceTrigger            INTEGER (1..maxNrofSRS-TriggerStates-1),
      csi-RS                                  NZP-CSI-RS-ResourceId                          OPTIONAL, -- Cond NonCodebook
      slotOffset                              INTEGER (1..32)                                OPTIONAL, -- Need S
      ...,
      [[
      aperiodicSRS-ResourceTriggerList        SEQUENCE (SIZE(1..maxNrofSRS-TriggerStates-2))
                                              OF INTEGER                                     OPTIONAL, -- Need M
                                              (1..maxNrofSRS-TriggerStates-1)
      ]]
    },
    semi-persistent                         SEQUENCE {
      associatedCSI-RS                        NZP-CSI-RS-ResourceId                          OPTIONAL, -- Cond NonCodebook
      ...
    },
    periodic                                SEQUENCE {
      associatedCSI-RS                        NZP-CSI-RS-ResourceId                          OPTIONAL, -- Cond NonCodebook
      ...
    }
  },
  usage                                   ENUMERATED {beamManagement, codebook, nonCodebook, antennaSwitching},
  alpha                                   Alpha                                              OPTIONAL, -- Need S
  p0                                      INTEGER (-202..24)                                 OPTIONAL, -- Cond Setup
  pathlossReferenceRS                     PathlossReferenceRS-Config                         OPTIONAL, -- Need M
  srs-PowerControlAdjustmentStates        ENUMERATED { sameAsFci2, seperateClosedLoop}       OPTIONAL, -- Need S
  ...,
  [[
  pathlossReferenceRSList-r16             SetupRelease { PathlossReferenceRSList-r16}        OPTIONAL --Need M
  ]]
}
PathlossReferenceRS-Config ::=           CHOICE {
  ssb-Index                                SSB-Index,
  csi-RS-Index                             NZP-CSI-RS-ResourceId
}
```

| SRS resource info configuration: |
| --- |

```
SRS-Resource ::=                        SEQUENCE {
  srs-ResourceId                          SRS-ResourceId,
  nrofSRS-Ports                           ENUMERATED {port1, ports2, ports4},     OPTIONAL, -- Need R
  ptrs-PortIndex                          ENUMERATED {n0, n1 }
  transmissionComb                        CHOICE {
    n2                                      SEQUENCE {
      combOffset-n2                           INTEGER (0..1),
      cyclicShift-n2                          INTEGER (0..7)
    },
    n4                                      SEQUENCE {
      combOffset-n4                           INTEGER (0..3),
      cyclicShift-n4                          INTEGER (0..11)
    }
  },
  resourceMapping                         SEQUENCE {
    startPosition                           INTEGER (0..5),
    nrofSymbols                             ENUMERATED {n1, n2, n4},
    repetitionFactor                        ENUMERATED {n1, n2, n4}
  },
  freqDomainPosition                      INTEGER (0..67),
  freqDomainShift                         INTEGER (0..268),
  freqHopping                             SEQUENCE {
    c-SRS                                   INTEGER (0..63),
    b-SRS                                   INTEGER (0..3),
    b-hop                                   INTEGER (0..3)
  },
  groupOrSequenceHopping                  ENUMERATED { neither, groupHopping, sequenceHopping },
  resourceType                            CHOICE {
    aperiodic                               SEQUENCE {
      ...
    },
    semi-persistent                         SEQUENCE {
      periodicityAndOffset-sp                 SRS-PeriodicityAndOffset,
```

-continued

SRS resource info configuration:

```
    },
    periodic                        SEQUENCE {
        periodicityAndOffset-p          SRS-PeriodicityAndOffset,
        ...
    }
},
sequenceId                      INTEGER (0..1023),
spatialRelationInfo             SRS-SpatialRelationInfo             OPTIONAL, -- Need R
...,
}
```

SRS spatial relation info configuration

```
SRS-SpatialRelationInfo ::= SEQUENCE {
    servingCellId           ServCellIndex    |OPTIONAL, -- Need S
    referenceSignal         CHOICE {
        ssb-Index               SSB-Index,
        csi-RS-Index            NZP-CSI-RS-ResourceId,
        srs                     SEQUENCE {
            resourceId              SRS-ResourceId,
            uplinkBWP               BWP-Id
        }
    }
}
```

The SRS-SpatialRelationInfo IE, shown in the SRS spatial relation info configuration presented above, provides the beam direction that the UE should use for the SRS resource via a CSI-RS or an SSB or an SRS resource. With this signaling, the gNB indicates to the UE that it shall use the spatial filter used for the reception of the SSB or CSI-RS resource or the transmission of the SRS resource provided in the SRS-SpatialRelationInfo IE of an SRS resource to transmit the SRS resource. The indication of the SRS-SpatialRelationInfo is vital in the case of FR2 where beamformed transmissions are required. The pathloss reference RS, which is configured via the RRC or indicated via a MAC, is used in the power control settings of the SRS to determine the PathLoss (PL) estimate for the transmission of the SRS [3].

The transmit power of SRS is obtained by a combination of parameters configured/indicated to the UE as follows: If a UE transmits SRS on active UL bandwidth part b of carrier f of serving cell c using SRS power control adjustment state with index l, the UE determines the SRS transmission power $P_{SRS,b,f,c}(i, q_s, l)$ in SRS transmission occasion i for the SRS resource set $q_s$ as:

$$P_{SRS,b,f,c}(i, q_s, l) = \min \left\{ \begin{array}{c} P_{CMAX,f,c}(i), \\ P_{O\_SRS,b,f,c}(q_s) + 10 \log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\} [dBm]$$

where, $P_{CMAX,f,c}(i)$ is the configured maximum UE transmit power [7] and [8]

$P_{O\_SRS,b,f,c}(q_s)$ is provided by the higher layer parameter p0 or the nominal PUSCH Tx power $M_{SRS,b,f,c}(i)$ is an SRS bandwidth expressed in number of resource blocks, which is obtained from the SRS configuration $PL_{b,f,c}(q_d)$ is a downlink pathloss estimate in dB calculated from the DL RS $q_d$ as described in [3] for the SRS resource set $q_s$. The pathloss estimate may be derived from the pathloss reference RS (a CSI-RS or an SSB resource) configured/indicated via a higher layer.

$\alpha_{SRS,b,f,c}(q_s)$ is a pathloss compensation factor configured by the higher layer parameter Alpha.

$h_{b,f,c}(i, l)$ is a closed loop power correction function that is dependent on the closed loop power control adjustment state configured in the SRS resource set IE (shown in the FIG. above).

Physical Uplink Control Channel (PUCCH)

The physical uplink control channel (PUCCH) carries control information such as channel state information (CSI) feedback, the hybrid automatic repeat request (HARQ) acknowledgement (ACK)/negative acknowledgements (NACK) for physical downlink shared channel (PDSCH) transmissions, and scheduling requests (SR). A unit of the PUCCH that carries uplink control information (UCI) is a PUCCH resource. A PUCCH resource is an RRC configured space in a certain format (format 0, 1, 2, 3) in a certain UL bandwidth-part (BWP) [3, 6]. The UL-BWP is a contiguous frequency domain space on which the UE transmits in the UL. The UE may be configured with up to 4 UL-BWPs, and it transmits on only one of them at a given time instance. The UL BWP on which the UE transmits is the active UL BWP. The UE is configured with four PUCCH resource sets via RRC. The PUCCH resources in a given PUCCH resource set can carry a specified load of uplink control channel information as indicated by the higher-layer parameter 'maxPayloadMinus1' [3]. The other parameters in the PUCCH resource configuration indicate the frequency hopping characteristics of the PUCCH resource.

The PUCCH resources that may carry the various types of the uplink control information (UCI)—Hybrid automatic repeat request (HARQ) acknowledgement (ACK)/negative acknowledgements (NACK) for physical downlink shared channel (PDSCH) transmissions, scheduling requests (SR) and DL channel state information (CSI) feedback—are configured and indicated as follows [2, 3, 6]:

The PUCCH resource that carries the HARQ ACK/NACK for a PDSCH, is indicated by a 3-bit PUCCH resource indicator field in the PDCCH that schedules the PDSCH. The mapping from the PUCCH resource indicator field contained in the PDCCH to a PUCCH resource in the four PUCCH resource sets is configured by the gNB via RRC as described in [3].

The scheduling requests (SR) are configured via RRC in the 'SchedulingRequestConfig' IE and other associated IEs, and each scheduling request configuration includes the IDs of PUCCH resource(s) that carry the SRs. The transmission settings of the SRs (periodicity, offset, etc.) are configured at the RRC level.

The CSI report configurations received via RRC at the UE includes the IDs of the PUCCH resources(s) that carry the semi-persistent and/or periodic CSI reports in the UL. The transmission settings of the same are provided in the CSI report configurations. The activation/deactivation of the semi-persistent CSI reports is handled via MAC-CE messages. The configuration of the CSI reports via RRC is enough for the transmission of periodic CSI reports.

The beam direction and power control settings of the PUCCH resources are configured together in a 'PUCCH-SpatialRelationInfo' IE, as shown in the PUCCH-SpatialRelationInfo configuration below. The parameter 'referenceSignal' in the PUCCH-SpatialRelationInfo IE contains the ID of a DL reference signal (a CSI-RS, or an SSB), or a UL reference signal (sounding reference signal—SRS). The other parameters in the PUCCH-SpatialRelationInfo IE comprise open and closed loop power control settings for the PUCCH transmission.

Applying a 'PUCCH-SpatialRelationInfo' IE to a PUCCH resource means that the UE shall use the same spatial filter as it uses for the reception of the DL RS or the transmission of the UL RS mentioned in the parameter 'referenceSignal' of the IE for the transmission of the PUCCH resource, and should apply the power control parameters in the IE to derive the transmit power for the transmission of the PUCCH resource. The PUCCH resources may be grouped via a PUCCH resource group ID for the application of spatial relation to a group of one or more PUCCH resources.

$P_{CMAX,f,c}(i)$ is the configured maximum UE transmit power defined in [7] and [8], $P_{O\_PUCCH,b,f,c}(q_u)$ is the sum of the nominal PUCCH transmit power $P_{O\_NOMINAL\_PUCCH}$, provided by a higher layer parameter p0-nominal (or set to a default value of 0 dBm), and $P_{O\_UE\_PUCCH}(q_u)$ provided by the parameter p0-PUCCH-Value and other dependent parameters. The ID of the p0-PUCCH-Value to choose is provided in p0-PUCCH-Id in the PUCCH-SpatialRelationInfo IE (shown in FIG. 3). The value $q_u$ is the size of for a set of $P_{O\_UE\_PUCCH}$ values provided via the higher layer parameter maxNrofPUCCH-P0-PerSet [6].

$M_{RB,b,f,c}^{PUCCH}(i)$ is the bandwidth of the PUCCH resource [1], which is obtained from the configuration of the PUCCH resource.

$PL_{b,f,c}(q_d)$ is a downlink pathloss estimate in dB calculated using RS resource index $q_d$ as described in [3]. The UE may be indicated explicitly with a pathloss reference RS for PUCCH via a PUCCH-SpatialRelationInfo. The pathloss reference RS is essentially a DL RS from which the UE estimates the pathloss from the gNB or any other network entity.

The parameters $\Delta_{F\_PUCCH}(F)$ and $\Delta_{TF,b,f,c}(i)$ are PUCCH power adjustment factors dependent on the PUCCH format.

The parameter $g_{b,f,c}(i, l)$ is a closed loop power adjustment dependent on a PUCCH power control adjustment state (configured in the parameter closedLoopIndex in the PUCCH-SpatialRelationInfo IE).

| PUCCH-SpatialRelationInfo configuration | | |
|---|---|---|
| PUCCH-SpatialRelationInfo ::= | SEQUENCE { | |
| pucch-SpatialRelationInfoId | PUCCH-SpatialRelationInfoId, | |
| servingCellId | ServCellIndex | OPTIONAL, -- Need S |
| referenceSignal | CHOICE { | |
| ssb-Index | SSB-Index, | |
| csi-RS-Index | NZP-CSI-RS-ResourceId, | |
| srs | PUCCH-SRS | |
| }, | | |
| pucch-PathlossReferenceRS-Id | PUCCH-PathlossReferenceRS-Id | |
| p0-PUCCH-Id | P0-PUCCH-Id, | |
| closedLoopIndex | ENUMERATED { i0, i1 } | |
| } | | |
| PUCCH-SpatialRelationInfoExt-r16 ::= | SEQUENCE { | |
| pucch-SpatialRelationInfoId-v1610 | PUCCH-SpatialRelationInfoId-v1610 | OPTIONAL, -- Cond SetupOnly |
| pucch-PathlossReferenceRS-Id-v1610 | PUCCH-PathlossReferenceRS-Id-v1610 | OPTIONAL, --Need R |
| ... | | |
| } | | |

The derivation of the transmit power of a PUCCH resource comprises the addition of open loop and closed loop power adjustments. If a UE transmits a PUCCH on an active UL bandwidth-part (BWP) b and carrier f in the primary cell c using a PUCCH power control adjustment state with index l, the UE determines the PUCCH transmission power $P_{PUCCH,b,f,c}(i, q_u, q_d, l)$ in PUCCH transmission occasion i as [3]:

$P_{PUCCH,b,f,c}(i, q_u, q_d, l) = \min$ $$\left\{ \begin{array}{l} P_{CMAX,f,c}(i), \\ P_{O\_PUCCH,b,f,c}(q_u) + 10\log_{10}(2^\mu \cdot M_{RB,b,f,c}^{PUCCH}(i)) + PL_{b,f,c}(q_d) + \\ \Delta_{F\_PUCCH}(F) + \Delta_{TF,b,f,c}(i) + g_{b,f,c}(i, l) \end{array} \right\} \text{[dBm]}$$

where,

The UE is configured with up to 8 PUCCH-SpatialRelationInfo parameters in 3GPP Rel. 15 and with up to 64 PUCCH-SpatialRelationInfo IEs in 3GPP Rel. 16. A specific beam direction and power control setting is applied to a PUCCH resource or a PUCCH resource group via a MAC-CE message in 3GPP Rel. 15 and 3GPP Rel. 16 that associates a PUCCH resource or a group of PUCCH resources with a PUCCH-SpatialRelationInfo.

There is however drawbacks with the known solutions. The beam management framework for the uplink involves individual configuration of beams, pathloss reference RSs and other power control settings for each uplink channel and/or RS. This results in the configuration of a particular uplink beam setting (spatial relation, pathloss reference RS, power control settings, etc.) separately for each uplink channel and/or RS. This leads to inefficiency in configuration and indication and thus to an increase in overhead and latency.

SUMMARY

As mentioned above, it is an objective of the embodiments herein to provide methods and apparatuses for signaling framework for flexible beam management in a wireless communications network such as advanced 5G networks.

According to an aspect of some embodiments herein, there is provided a method performed by a UE, the method comprising: receiving, from a network node, via a higher layer, a configuration of at least one information element (IE), said configuration comprising at least: an identifier (ID) unique to each IE and ID(s) of one or more uplink, UL, resource(s) and/or downlink, DL resource(s) that is/are used to indicate at least a spatial filter or beam direction for transmission of at least a Physical Uplink Shared Channel (PUSCH) resource and a Physical Uplink Control Channel (PUCCH) resource, and/or a Sounding reference Signal, (SRS) resource; and applying the configuration provided in the at least one IE for the transmission of the PUSCH resource, and the PUCCH resource and/or the SRS resource.

According to another aspect of embodiments herein, there is provided a UE comprising a processor and a memory containing instructions executable by the processor, whereby said UE is operative or configured to perform any one of the embodiments presented in the detailed description related to the actions performed by the UE.

According to an aspect of some embodiments herein, there is provided a method performed by a network node or gNB, the method comprising: transmitting, to a UE, via a higher layer, a configuration of at least one information element (IE) said configuration comprising at least: an identifier (ID) unique to each IE and ID(s) of one or more uplink (UL) resource(s) and/or downlink (DL) resource(s) that is/are used to indicate at least a spatial filter or beam direction for transmission of at least a Physical Uplink Shared Channel (PUSCH) resource and a Physical Uplink Control Channel (PUCCH) resource, and/or a Sounding reference Signal (SRS) resource; for enabling the UE to apply the configuration provided in the at least one IE for the transmission of the PUSCH resource, and the PUCCH resource and/or the SRS resource; and receiving, from the UE, the PUSCH resource and the PUCCH resource and/or the SRS resource.

According to another aspect of embodiments herein, there is provided a network node comprising a processor and a memory containing instructions executable by the processor, whereby said network node is operative or configured to perform any one of the embodiments presented in the detailed description related to the network node.

There is also provided a computer program comprising instructions which when executed on at least one processor of the UE, cause the at least said one processor to carry out the actions or method steps presented herein.

There is also provided a computer program comprising instructions which when executed on at least one processor of the network node, cause the at least said one processor to carry out the method steps presented herein.

A carrier is also provided containing the computer program, wherein the carrier is one of a computer readable storage medium; an electronic signal, optical signal, or a radio signal.

An advantage of embodiments herein is to reduce higher layer control information overhead and latency and enhancing dynamic indication of beam settings for uplink beam management. Additional advantages of the embodiments herein are provided in the detailed description of this disclosure.

DETAILED DESCRIPTION

Figure 1:
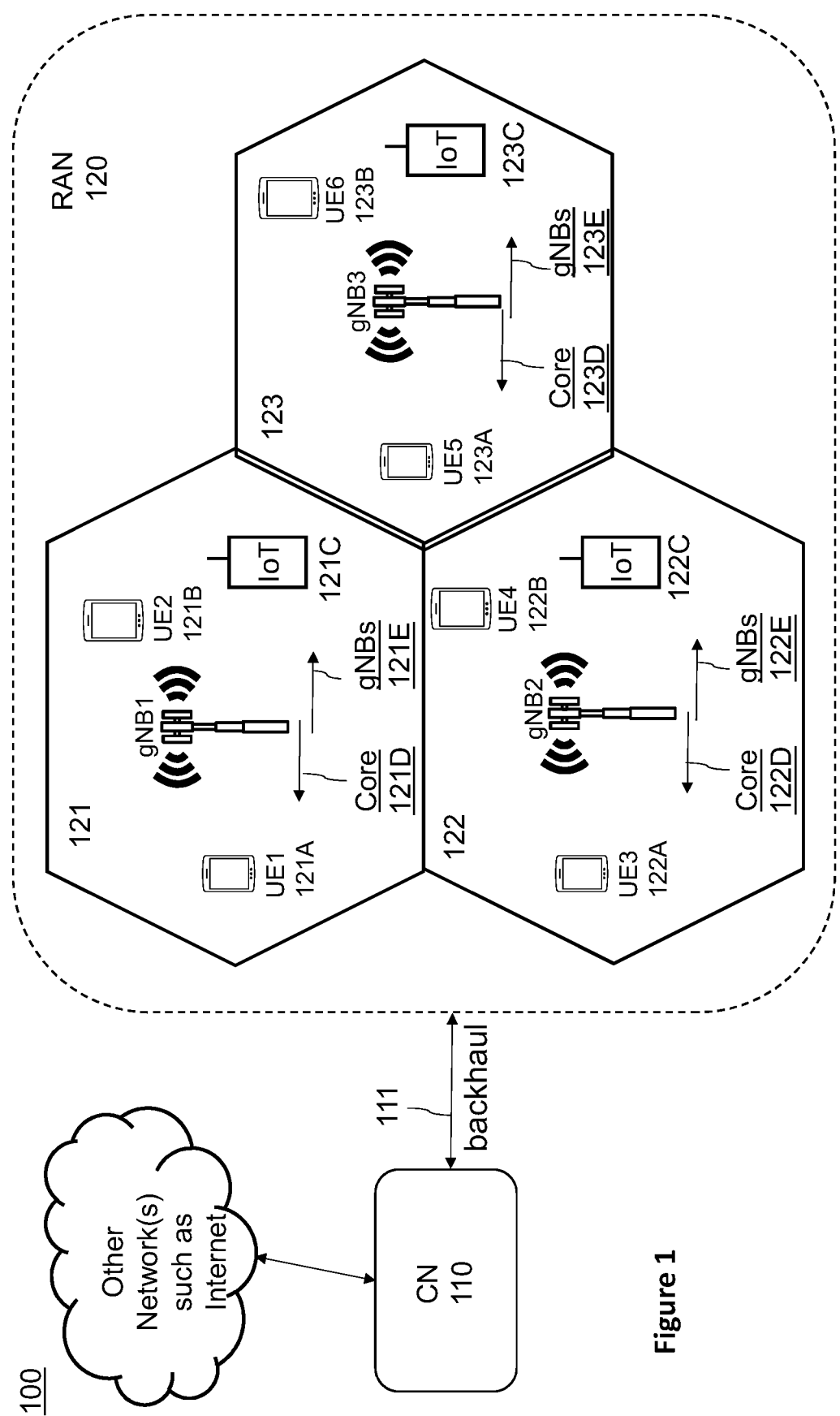
FIG. 1 depicts a simplified state of the art view of a wireless communications network including a core network and a radio access network.

In the following, a detailed description of the exemplary embodiments is described in conjunction with the drawings, in several scenarios to enable easier understanding of the solution(s) described herein.

As mentioned before, it is an objective of the embodiments herein to provide methods and apparatuses for signaling framework for flexible beam management in a wireless communications network such as advanced 5G networks. The embodiments herein provide methods and apparatuses for reducing higher layer control information overhead and enhancing dynamic indication of beam settings for uplink beam management.

Configuration of the UL Beam Directions for Multiple UL Channel(s) and RS(s)

In accordance with some embodiments, the UE is configured to:
receive from a network node, via a higher layer, a configuration of at least one Information element (IE), that comprises at least: an identifier (ID) unique to each IE and the ID(s) of one or more uplink (UL) and/or downlink (DL) resource(s) that is/are used to indicate at least a spatial filter or spatial relation or beam direction for the transmission of at least a PUSCH resource and/or a PUCCH resource and/or a SRS resource, and
applying the setting or the configuration provided in the IE for the transmission of at least the PUSCH resource, and/or the PUCCH resource, and/or the SRS resource.

Hence, when the UE applies the setting or configuration, the UE transmits to the network node, at least the PUSCH resource, and/or the PUCCH resource, and/or the SRS resource In accordance with an embodiment, the DL resource(s) or UL resource(s) indicated in the IE may be one of the following: a CSI-RS resource, an SRS resource, or a synchronization signal block (SSB), or optionally, a CORESET.

The application or derivation of a spatial filter or spatial relation or beam direction from a DL RS resource or an UL RS resource indicated in the IE for the transmission of a PUCCH resource, an SRS resource, or a PUSCH results in the following UE behavior:
If the DL resource is a non-zero-power (NZP) CSI-RS resource, the PUCCH resource, SRS resource, or PUSCH may be transmitted with the same spatial filter (or a spatial filter derived from the spatial filter) or beam direction used for the reception of the NZP CSI-RS resource.

If the DL resource is a Synchronization Signal-Physical Broadcast Channel Block (SS-PBCH), i.e., an SSB, the PUCCH resource, SRS resource, or PUSCH may be transmitted with the same spatial filter (or a spatial filter derived from the spatial filter) or beam direction used for the reception of the SSB.

If the UL resource is a SRS resource, the PUCCH resource, SRS resource or PUSCH may be transmitted with the same spatial filter (or a spatial filter derived from the spatial filter) or beam direction used for the transmission of the SRS resource.

If the DL resource is a CORESET, the PUCCH resource, SRS resource, or PUSCH may be transmitted with the same spatial filter (or a spatial filter derived from the spatial filter) or beam direction used for the reception of one or more PDCCH(s) on said CORESET.

It should be noted that the expression 'The derivation of the spatial filter or spatial relation from the spatial filter or beam direction used for the transmission or reception of a resource X' may mean that the UE may, based on its own implementation, derive from a reference spatial filter used for the transmission or reception of resource X, a spatial filter or beam direction that may or may not be identical to the reference spatial filter. The UE may perform some refinement or modification of the beam, if/when it is required.

The IE described above, for example, might be titled as 'UL-TransmissionConfigurationIndication', or 'UL-TCI'.

In accordance with an embodiment, the UE is configured to receive from the network node, via a higher layer, an association of an 'UL-TransmissionConfigurationIndication' IE with at least one SRS resource, or SRS resource set, or PUCCH resource, or PUCCH resource group, or PUSCH.

In a non-limiting example, the UE may receive e.g. a MAC-CE message that comprises at least the following: the ID of at least one 'UL-SpatialFilter' IE, and at least one of the following:
  The ID(s) of one or more SRS resource(s)
  The ID(s) of one or more SRS resource set(s)
  The ID(s) of one or more PUCCH resource(s)
  The ID(s) of one or more PUCCH resource group(s)
  The ID(s) of one or more uplink bandwidth part(s), BWP(s)

After the reception of the association in e.g. the MAC-CE message or via a higher layer, the UE applies the spatial relation or beam direction provided in the at least one IE to at least one of the indicated SRS resource(s) and/or SRS resource(s) in the indicated SRS resource set(s) and/or PUCCH resource(s) and/or PUCCH resource(s) in the indicated PUCCH resource group(s) and/or PUSCH or at least one uplink transmission on an indicated UL bandwidth part (BWP).

Usage of UL-TCI for Pathloss Reference RS Indication

According to an embodiment, the UE is configured to use/apply one or more DL and/or UL resource(s) contained in the 'UL-TransmissionConfigurationIndication' IE as a reference for the derivation of a pathloss factor, i.e., as a pathloss reference, for the transmission of at least a PUSCH, a PUCCH resource, or an SRS resource. In addition, the IE may comprise one or more indication(s) whether one or more UL and/or DL resource(s) in the IE is/are to be used as a reference for the derivation of the pathloss factor, i.e., used as a pathloss reference, for the uplink transmission. The pathloss factor may be used to obtain a transmit power for said PUSCH, PUCCH resource, SRS resource or the SRS resource(s) in said SRS resource set.

It is to be noted that the term 'pathloss factor', in this disclosure, is used to refer to a pathloss estimate calculated from a reference signal or resource, and/or to the downlink pathloss estimate value $PL_{b,f,c}(q_d)$ calculated by the UE in an UL BWP b, a carrier f and a cell c, using reference signal (RS) with index $q_d$ that is provided in the transmit power expression(s) in the NR specifications.

In accordance with an embodiment, the indication of whether one or more UL and/or DL resource(s) in an UL-TCI IE is/are to be used as a reference for the derivation of the pathloss factor for an uplink transmission by the UE may be provided in said UL-TCI IE, or explicitly provided via a different higher layer indication (via Radio Resource Control (RRC) or a MAC-CE message, for example) or a priori known to the UE (i.e., it is provided in the NR 3GPP specification(s)).

In accordance with an embodiment, for the UL transmission of at least a PUSCH, a PUCCH resource or an SRS resource or the SRS resource(s) in an SRS resource set, the UE may be provided via an UL-TCI IE or any other method (any permitted or permissible method available via the NR specifications or any method applicable in this disclosure), a pathloss reference RS for the computation or derivation of the pathloss factor to obtain the transmit power for said PUSCH, PUCCH resource, SRS resource or the SRS resource(s) in said SRS resource set as described above. The computation or derivation of the pathloss factor and/or the obtaining of the pathloss reference RS for the computation or derivation of the pathloss factor may be performed as described in the embodiments below.

Derivation of Pathloss Factor from a DL Resource

In accordance with some embodiments, the UE is configured to compute/derive the pathloss factor for an uplink transmission of a PUCCH, SRS or PUSCH from a downlink reference signal resource that is used as a pathloss reference RS as follows: the pathloss factor in subcarrier f in serving cell c is computed from the indicated pathloss reference RS $q_d$ as $PL_{f,c}(q_d)$=ReferenceSignalPower—RSRP, where RSRP is the higher layer filtered reference signal received power and the ReferenceSignalPower is the transmit power of said pathloss reference RS which is provided by higher layer(s) or fixed in the NR specification. The higher layer filter may be implemented as described in [6].

In accordance with an embodiment, if the pathloss factor for an UL transmission of a PUCCH resource, or SRS resource or PUSCH is to be computed/derived from a CORESET, the UE may obtain the pathloss factor from one of the DL RSs that provides the QCL assumptions for the reception of the PDCCH(s) on the CORESET.

For example, if a CORESET denoted 'C' has the following QCL assumptions: DL RS 'D1' with QCL-typeA and DL RS 'D2' with QCL-typeD, and the pathloss reference for PUCCH resource 'A' is to be obtained from CORESET 'C', then the UE may compute/derive the pathloss factor for the computation of the transmit power of the PUCCH resource from DL RS 'D1' or DL RS 'D2'. It is to be noted that the QCL assumptions of a CORESET may be indicated or provided by any method possible or permitted in the NR specifications or any other method applicable in this disclosure.

Derivation of Pathloss Factor from an UL Resource

In accordance with an embodiment, if the pathloss reference for an UL transmission of a PUCCH resource, or SRS resource, or PUSCH is to be obtained from an UL RS resource, the UE may obtain the pathloss factor from a DL RS that is used as a spatial relation and/or as a pathloss reference RS for said uplink RS resource or an uplink RS resource set comprising the uplink RS resource.

For example, consider a PUCCH resource 'A' that is provided with SRS resource 'S' as a pathloss reference RS, wherein the UE uses DL RS 'D' as a pathloss reference and/or a spatial relation for the SRS resource 'S' or the SRS resource set that comprises the SRS resource 'S'. Then, the UE uses the DL RS 'D' as a pathloss reference RS for the uplink transmission of the PUCCH resource 'A'. This means, the pathloss factor for the computation of the transmit power of the PUCCH resource 'A' is obtained from the DL RS 'D'. The DL RS 'D' that is used as a pathloss reference RS and/or as a spatial relation for the SRS resource 'S' or the SRS resource set that comprises the SRS resource 'S' may be indicated or provided for said resource or resource set via any method permitted or possible via the NR specifications or any method provided in this disclosure. This is an indirect/implicit method of providing a pathloss reference RS, which is usually a DL RS, via a UL RS or UL RS resource set. In the case of the pathloss reference RS is provided via an UL-TCI IE, the DL RS 'D' may not be mentioned directly in the IE.

In accordance with an embodiment, the UL resource contained in the 'UL-TransmissionConfigurationIndication' UL-TCI IE and used as a reference for the derivation of the pathloss factor may be an SRS resource set. The determination of the DL RS to be used for the computation or derivation of the pathloss factor may be performed using the following method.

If the pathloss reference for an UL transmission of a PUCCH, SRS or PUSCH is obtained from an UL RS resource set (an SRS resource set, for example), the UE may obtain the pathloss factor from a DL RS that is used as a pathloss reference RS and/or as a spatial relation for said UL RS resource set (the SRS resource set, for example) or one of the uplink RS resources in the UL RS resource set. For example, consider a PUCCH resource 'A' that is provided with SRS resource set 'S' as a pathloss reference, wherein the UE uses DL RS 'D' as a pathloss reference and/or as a spatial relation for the SRS resource set 'S' or at least one SRS resource in the SRS resource set 'S'. Then, the UE uses the DL RS 'D' as a pathloss reference RS for the UL transmission of the PUCCH resource 'A'.

This means, the pathloss factor for the computation of the transmit power of the PUCCH resource 'A' is obtained from the DL RS 'D'. The DL RS 'D' that is used as a pathloss reference RS for the SRS resource set 'S' or at least one SRS resource in the SRS resource set 'S' may be indicated or provided for said resource/resource set via any method permitted or possible via the NR specifications or any method provided in this disclosure.

Explicit Indication of Spatial Filter and/or Pathloss Reference RS in UL-TCI

In accordance with an embodiment, the 'UL-TransmissionConfigurationIndication' (UL-TCI) IE may comprise an indication, or a parameter indicating whether a DL or UL resource indicated in the IE is to be used to derive an UL spatial filter or beam direction only, or is a reference for the derivation of the pathloss factor only, or to be used to derive an UL spatial filter or beam direction and as a reference for the derivation of the pathloss factor for an UL transmission. In some examples, the indication may be performed as follows:

If the indicating parameter is set with a value 'A', then the UE may use said resource to derive an uplink spatial filter/beam direction, If the indicating parameter is set with a value 'B', then the UE may use said resource to derive the pathloss factor for the calculation of an uplink transmission power, i.e., use said resource as a pathloss reference, If the indicating parameter is set with a value 'C', then the UE may use said resource to derive the pathloss factor for the calculation of an uplink transmission power, i.e., use said resource as a pathloss reference and to derive an uplink spatial filter/beam direction.

The indicating parameter may be referred to as 'quasi-colocation, QCL, type' or 'assumptionType' or 'beamDirectionOrPathlossRefRSSelection', for example. A DL or UL resource in the IE may be associated with a QCL type parameter, or multiple resources in the IE may be associated with a QCL-type parameter. Examples of suitable values may be given by 'A', 'B' and 'C' to indicate the different behaviors the UE may perform.

An example of different possibilities for the contents of the UL-TCI IE comprising up to two UL/DL resources, each with an associated QCL type, and the corresponding UE behavior are provided in Table 1 below. It is to be noted that a DL resource may be a 'CORESET', a CSI-RS resource or an SSB resource. The UL resource may be an SRS resource or a resource set.

TABLE 1

Examples of possibilities of resource and QCL type configurations in a UL-TCI IE

| Resource 1 and QCL type | Resource 2 and QCL type | UE behavior |
|---|---|---|
| DL resource 'D1' with QCL-type C | — | Use 'D1' for both spatial relation and pathloss reference |
| DL resource 'D1' with QCL-type A | DL resource 'D2' with QCL type B | Use 'D1' for spatial relation and 'D2' for pathloss reference |
| UL resource 'U1' with QCL-type A | DL resource 'D2' with QCL type B | Use 'U1' for spatial relation and 'D2' for pathloss reference |
| UL resource 'U1' with QCL-type A | UL resource 'U2' with QCL type B | Use 'U1' for spatial relation and 'U2' for pathloss reference |
| UL resource 'U1' with QCL-type C | — | Use 'U1' for both spatial relation and pathloss reference |

For example and with reference to Table 1 above, assuming that the UL-TCI IE comprise one DL RS 'D1' with QCL-type C, this means that the UE shall use the DL RS 'D1' for both spatial filter or spatial relation and pathloss reference RS derivation (see first row of Table 1). In another example, the UL-TCI IE may comprise one UL RS with QCL-type A and one DL RS with QCL-type B, which means that the UE shall use the UL RS to obtain the spatial filter or spatial relation and the DL RS as a pathloss reference (see third row in Table 1).

From the above table, it can be understood that the UL-TCI IE may provide spatial relation and/or pathloss reference RS in one of the following ways:

One UL or DL resource provided in the UL-TCI IE that is used as a reference to derive a spatial relation for UL transmission(s), or One UL or DL resource provided in the UL-TCI IE that is used as a pathloss reference for UL transmission(s), or One UL or DL resource provided in the UL-TCI IE that is used as a reference to derive a spatial relation for UL transmission(s) and one other UL or DL resource provided in the IE that is used as a pathloss reference for UL transmission(s).

Moreover, the application of the spatial relation and/or the pathloss reference RS as described in the above methods may be performed on various sets of target channel(s) and/or resources in the UL. Therefore, the above methods help in providing various choices of application of the UL-TCI IE thereby allowing various implementation use-cases. The following choices of application (target channel(s) and/or resource(s)) are possible from the above methods (the use-cases they may be applicable to are provided along with them):

1) The UL-TCI IE may apply to at least a PUSCH and at least one PUCCH resource. Two different scenarios are possible for such an application of the UL-TCI IE—the control and the data channels may be in the same cell and all the PUSCH and some or all of the PUCCH resources are applied with the same spatial relation or, both the control and data channel in the UL in a given cell are applied with multiple spatial relations as they are associated with different specific transmit-receive-points (TRPs) or different UE port-groups or panels. The TRP may be a base station or any other network node that the UE may receive from in the downlink or transmit to in the uplink. For example, the UL-TCI IE may be applied to all the PUSCH in a given cell along with all PUCCH resources that are UE-dedicated (configured via RRC for the UE; not common PUCCH resources that may be configured for a set of UEs). In another example, at least a subset of PUSCH transmission and a subset of all the configured PUCCH resources (or a subset of PUCCH resource groups) may be indicated with spatial relation and/or PL-RS with the UL-TCI IE wherein said PUSCH transmission and PUCCH resources are directed to a specific TRP or originate from a specific set of port(s)/panel(s) from the UE.

2) The UL TCI-IE may apply to at least a PUSCH and at least one SRS resource. This may happen in case the control signaling and the data channels are separate (in terms of cell configuration or TRP configuration). The SRS resources for codebook or non-codebook may share the same beam as the PUSCH wherein said SRS resources are usually used for indicating the ports of the PUSCH transmission. If one of the SRS resources from a SRS resource set for beam management shares the same UL-TCI IE as a PUSCH, that may save as a reference to the UE for UL sounding with the other SRS resources (in the same set) for beam management. Overall, this method of application helps in aligning the beam management of data channel and reference sounding when the control and data channels in the UL are separate. In another use-case, it may also help when the UL feedback of control data is separated towards different TRPs while the data is not—this may happen when the downlink data is separately transmitted from different TRPs and the UL control data regarding the DL data reception (such as HARQ ACKs) may be directed towards the respective TRPs but the uplink transmission of data, for overhead or redundancy reduction, may be directed toward just a single TRP.

3) The UL-TCI IE may apply to at least a PUSCH, at least one PUCCH resource and at least one SRS resource. In this case, the data and control channels are in one cell and all/subset of PUSCH transmissions, all/subset PUCCH resources and subset of SRS resources may be aligned for UL transmission in a cell, or towards a single TRP/from a single panel (or group of port(s)) in a given cell. It may especially be important for UEs that support just one beam in a cell or one beam per TRP/panel in a cell.

Note: The term 'a PUSCH resource' or 'a PUSCH' in this disclosure may refer to a PUSCH transmission or time/frequency/port/panel resources that are used for the transmission of a PUSCH.

Indication Outside of UL-TCI IE Regarding Usage of Spatial Filter and/or Pathloss Reference RS In accordance with an embodiment, one or more DL and/or UL resource(s) contained in the UL-TCI IE is/are used as a reference for the derivation of the pathloss factor, i.e., used as a pathloss reference, and/or for the derivation of spatial filter/spatial relation/beam direction, for the transmission of at least one PUSCH, PUCCH resource, or SRS resource. In an example, the IE may not comprise an explicit indication if the DL/UL resource(s) is/are to be used for spatial filter or beam direction derivation or as pathloss reference or both. One of the following methods may be used to determine if the resource(s) in the UL-TCI IE are to be used as pathloss reference or to derive spatial relation or both:

Predefine the method in the NR specification(s), or

Indicate explicitly via a higher layer (e.g., RRC or MAC) to the UE of what the resource(s) shall be used for, or Use an indirect/implicit method of determining what the resource(s) shall be used for.

In an example, the use of the indirect/implicit method may be indicated to the UE via a higher layer (e.g. RRC or MAC or MAC-CE). In another example, the usage of the resource(s) in the UL-TCI IE are predefined in the NR specification(s). For example, if a DL RS is provided in the UL-TCI IE, then this RS may be used as a pathloss reference and UL spatial filter. If an UL RS is provided in the IE, the RS is used to derive only the spatial filter. If an UL RS and a DL RS are provided in the IE, the UL RS is used to derive the spatial filter and the DL RS is used as a pathloss reference RS.

In an example for explicit indication of the same, an indication via a higher layer may instruct the UE to, for example, use an UL RS as a spatial filter reference or beam direction reference only, use a DL RS as a pathloss reference and spatial filter reference if only a DL RS is provided in a UL-TCI IE and use a DL RS only as a pathloss reference if an UL RS is also provided in a UL-TCI-IE. In another example of the indication, the UE may be instructed to use the provided RS in the UL-TCI IE for pathloss reference or spatial filter derivation or both (there may be an implicit assumption here that only one RS is provided in an UL-TCI IE).

Explicit Indication of 'UL-TransmissionConfiguration-Indication' (UL-TCI) IE with a Resource Via MAC-CE In accordance with some embodiments, the UE is configured to receive from a network node, via a higher layer, an association of an 'UL-TransmissionConfigurationIndication' IE with at least one SRS resource or SRS resource set or PUCCH resource or PUCCH resource group or PUSCH. For example, the UE may receive a MAC-CE message that comprises at least the following: the ID of at least one UL-TCI IE, and one or more of the following:

The ID(s) of one or more SRS resource(s)
The ID(s) of one or more SRS resource set(s)
The ID(s) of one or more PUCCH resource(s)
The ID(s) of one or more PUCCH resource group(s)
The ID(s) of one or more uplink bandwidth part(s), BWP(s)

After the reception of the MAC-CE message, the UE applies the spatial relation and/or pathloss reference RS provided in the at least one information element to at least one of the indicated SRS resource(s) and/or SRS resource(s) in the indicated SRS resource set(s) and/or PUCCH resource(s) and/or PUCCH resource(s) in the indicated PUCCH resource group(s) and/or PUSCH or at least one uplink transmission on an indicated UL BWP.

In accordance with an embodiment, the UE is configured to receive from a network node, via a higher layer, an association of an UL-TCI IE with at least one SRS resource or SRS resource set or PUCCH resource or PUCCH resource group or PUSCH. For example, the UE may receive a MAC-CE message that comprises at least the following: the ID of at least one UL-TCI IE, one or more indication(s) of whether the RS(s) in the IE are to be used as spatial relation reference(s) and/or pathloss reference(s), and one or more of the following:

The ID(s) of one or more SRS resource(s)
The ID(s) of one or more SRS resource set(s)
The ID(s) of one or more PUCCH resource(s)
The ID(s) of one or more PUCCH resource group(s)
The ID(s) of one or more uplink bandwidth part(s), BWP(s)

After the reception of the MAC-CE message, the UE applies the spatial relation and/or pathloss reference RS provided in the at least one information element according to the indication(s) provided in the MAC-CE message to at least one of the indicated SRS resource(s) and/or SRS resource(s) in the indicated SRS resource set(s) and/or PUCCH resource(s) and/or PUCCH resource(s) in the indicated PUCCH resource group(s) and/or PUSCH or at least one uplink transmission on an indicated UL BWP. For example, the indication might indicate a QCL type described in one of the previous methods wherein the QCL type indicated if the RS(s) associated with the indicated QCL type are to be used as spatial relation reference(s) or pathloss reference(s) or both. In another example, the indication might comprise one of three values: $b_0$, $b_1$, $b_2$, wherein:

a value of $b_0$ may indicate that one or more RS(s) in the UL-TCI IE may be used as spatial relation reference for said UL channel(s) or RS(s),
a value of $b_1$ may indicate that one or more RS(s) in the UL-TCI IE may be used as pathloss reference RS(s) for UL channel(s) or RS(s), and
a value of $b_2$ may indicate that one or more RS(s) in the UL-TCI IE may be used as spatial relation reference and pathloss reference RS(s) for said UL channel(s) or RS(s).

Configuration of Multiple UL Tx Settings

In accordance with some embodiments, the UE is configured to receive from a network node, via a higher layer, a configuration of an IE, comprising a set of parameters used for the configuration of an UL beam direction (or spatial filter) and/or pathloss reference and/or one or more power control settings to be used in an UL transmission; wherein the IE contains at least: an ID unique to each IE and the ID(s) of one or more UL, and/or DL RS resource(s); and optionally, at least one of the following parameters:

One or more indication(s) comprising whether one or more resource(s) indicated in the IE is/are to be used to derive an UL spatial filter/beam direction/spatial relation and/or to be used as a reference for the derivation of the pathloss factor, i.e., used as a pathloss reference, for an uplink transmission,
An indication of one or more of the following power control parameters for an uplink transmission: a closed loop power control index, a p0 value or an indication to an information element with a p0 value, an alpha value or an indication to an information element with an alpha value, wherein p0 and alpha are used in the calculation of an uplink transmission power.

When the UE receives the configuration, the UE is configured to apply the settings, or the configuration provided in the IE for the transmission of at least a PUSCH and/or a PUCCH resource and/or a SRS resource.

The DL or UL resource mentioned above may be one of the following: a CSI-RS resource, an SRS resource or a synchronization signal block (SSB) and optionally, a CORE-SET or an SRS resource set.

The IE described above, for example, might be titled UL-TCI IE or 'UL-TxSettings' as previously mentioned.

The computation/derivation of the spatial filter/beam direction/spatial relation and pathloss reference RS from various UL and DL resource(s) is described by previously provided methods.

In accordance with an embodiment, the UE is configured to receive from a network node, via a higher layer, a configuration of a UL-TCI IE, with at least one parameter indicating whether a resource indicated in the IE is to be used to derive an UL spatial filter/beam direction and/or to be used as a reference for the derivation of the pathloss factor, wherein the indication may be performed as follows:

If the indicating parameter is set with a value A, then the UE may use said resource to derive an uplink spatial filter/beam direction
If the indicating parameter is set with a value B, then the UE may use said resource to derive the pathloss factor for the calculation of an uplink transmission power, i.e., use said resource as a pathloss reference
If the indicating parameter is set with a value C, then the UE may use said resource to derive the pathloss factor for the calculation of an uplink transmission power, i.e., use said resource as a pathloss reference, and to derive an uplink spatial filter/beam direction.

The indicating parameter may be called 'quasi-colocation, QCL, type' or 'assumptionType' or 'beamDirectionOrPathlossRefRSSelection', for example. Each DL or UL resource in the IE may be associated with a QCL type parameter or multiple resources may be associated with a QCL-type parameter. Examples of suitable values may be assigned to A, B and C to indicate the different behaviors the UE performs. An example of different possibilities for the UL-TCI IE comprising up to two UL/DL resources, each with an associated QCL type, and the corresponding UE behavior are provided in Table 1 previously presented.

In accordance with an embodiment, one or more DL and/or UL resource(s) contained in the UL-TCI IE is/are used as a reference for the derivation of the pathloss factor, i.e., used as a pathloss reference, and/or for the derivation of spatial filter/spatial relation/beam direction, for the transmission of at least one PUSCH, PUCCH resource, or SRS resource. The information element may not comprise an indication if the DL/UL resource(s) is/are to be used for spatial filter derivation or as pathloss reference or both. One of the following methods may be used to determine if the resource(s) in the UL-TCI IE are to be used as pathloss reference or to derive spatial relation or both:

Predefine the method in the specification
Indicate explicitly via a higher layer (e.g., RRC or MAC) of what the resource(s) shall be used for
Use an indirect/implicit method of determining what the resource(s) shall be used for Examples of the implicit and explicit methods of indication are provided in one of the previously described methods.

In accordance with embodiments, the UE is configured to receive from a network node, via a higher layer, an association of an UL-TCI IE with at least one SRS resource or SRS resource set or PUCCH resource or PUCCH resource group or PUSCH. For example, the UE may receive a MAC-CE message that comprises at least the following: the ID of at least one 'UL-TxSettings' IE, and one of the following:

The ID(s) of one or more SRS resource(s)
The ID(s) of one or more SRS resource set(s)
The ID(s) of one or more PUCCH resource(s)
The ID(s) of one or more PUCCH resource group(s)
The ID(s) of one or more uplink bandwidth part(s), BWP(s)

After the reception of the MAC-CE message, the UE applies the spatial relation and/or pathloss reference RS and/or power control settings provided in the at least one information element to at least one of the indicated SRS resource(s) and/or SRS resource(s) in the indicated SRS resource set(s) and/or PUCCH resource(s) and/or PUCCH resource(s) in the indicated PUCCH resource group(s) and/or PUSCH or at least one uplink transmission on an indicated UL BWP.

Configuration of Separate Pathloss Reference RS IE(s)

In the previous methods, the UL-TCI IE was used for the indication of a spatial relation or pathloss reference RS or both. The separation of the two parameters may help in scenarios where the pathloss reference computation and application may be different from the application timing of the spatial relation.

In accordance with an embodiment, the UE is configured to receive from a network node, via a higher layer, a configuration of at least one IE, that comprises at least: an ID unique to each IE and the ID(s) of one or more UL and/or DL RS resource(s) that is used to indicate pathloss reference RS(s) to derive the pathloss factor for the transmission of at least a PUSCH and/or a PUCCH resource and/or a SRS resource.

The DL or UL resource mentioned above may be one of the following: a CSI-RS resource, an SRS resource or a SSB and optionally, a CORESET or an SRS resource set.

The IE described above, for example, might be titled 'UL-PathlossReferenceRS'.

The computation of the pathloss reference RS from various UL and DL resource(s) including CORESET(s), SRS resources and SRS resource set(s) is described in previously described methods.

In accordance with an embodiment, the UE is configured to receive from a network node, via a higher layer, an association of an 'UL-PathlossReferenceRS' IE with at least one SRS resource or SRS resource set or PUCCH resource or PUCCH resource group or PUSCH. For example, the UE may receive a MAC-CE message (or any suitable higher layer signaling) that comprises at least the following: the ID of at least one 'UL-PathlossReferenceRS' IE, and at least one of the following:

The ID(s) of one or more SRS resource(s)
The ID(s) of one or more SRS resource set(s)
The ID(s) of one or more PUCCH resource(s)
The ID(s) of one or more PUCCH resource group(s)
The ID(s) of one or more uplink bandwidth part(s), BWP(s)

After the reception of the MAC-CE message, the UE applies pathloss reference RS provided in the at least one information element to at least one of the indicated SRS resource(s) and/or SRS resource(s) in the indicated SRS resource set(s) and/or PUCCH resource(s) and/or PUCCH resource(s) in the indicated PUCCH resource group(s) and/or PUSCH or at least one uplink transmission on an indicated UL BWP.

Association of Pathloss Reference RS with Spatial Filter

In accordance with some embodiment, the UE is configured to receive from a network node, via a higher layer a configuration of at least one IE, that comprises at least: an ID unique to each IE and the ID(s) of one or more UL, and/or DL, resource(s) that is used to indicate at least the spatial filter/spatial relation/beam direction for the transmission of at least a PUSCH and/or a PUCCH resource and/or a SRS resource, a configuration of at least one IE, that comprises at least: an ID unique to each IE and the ID(s) of one or more UL resources, and/or DL RS resource(s) that is used to indicate pathloss reference RS(s) to derive the pathloss factor for the transmission of at least a PUSCH and/or a PUCCH resource and/or a SRS resource, and an association at least one IE indicating a spatial relation with an IE indicating a pathloss reference for at least a PUSCH and/or a PUCCH resource and/or a SRS resource, The UE then applies the spatial relation and pathloss reference for the transmission of at least a PUSCH and/or a PUCCH resource and/or a SRS resource.

The IE providing the spatial relation may be titled 'UL-TransmissionConfigurationIndication' IE or the 'UL-SpatialFilter' IE as previously described. The IE providing the pathloss reference may be titled 'UL-PathlossReferenceRS' or 'PathlossReferenceRS'.

In accordance with some embodiment, the association may be obtained via a MAC-CE message that comprises at least the following: the identifier of at least one IE providing a spatial relation, the identifier of at least one IE providing a pathloss reference, and at least one of the following:

The ID(s) of one or more SRS resource(s)
The ID(s) of one or more SRS resource set(s)
The ID(s) of one or more PUCCH resource(s)
The ID(s) of one or more PUCCH resource group(s)
The ID(s) of one or more uplink bandwidth part(s), BWP(s)

After the reception of the MAC-CE message, the UE applies the indicated at least one spatial relation(s) and the at least one pathloss reference RS provided to at least one of the indicated SRS resource(s) and/or SRS resource(s) in the indicated SRS resource set(s) and/or PUCCH resource(s) and/or PUCCH resource(s) in the indicated PUCCH resource group(s) and/or PUSCH or at least one uplink transmission on an indicated UL BWP.

In another method, the association may be performed via RRC or a higher layer wherein one IE is referred to in another IE.

In accordance with an embodiment, an IE providing a spatial relation (or beam direction), i.e., a UL-TCI IE, and an IE providing pathloss reference, i.e., a 'UL-PathlossReferenceRS' IE, may be associated via a higher layer in one or more of the following ways:

The 'UL-PathlossReferenceRS' IE may comprise the ID of a UL-TCI IE
The UL-TCI IE may comprise the ID of a 'UL-PathlossReferenceRS' IE The pathloss reference and spatial relation IEs associated thusly via RRC or a higher layer may be associated via a higher layer (RRC, MAC-CE message, for example) with one or more SRS resource(s), SRS resource set(s), PUCCH resource(s), PUCCH resource group(s) or PUSCH(s).

After the UE receives a signaling that associates a UL-TCI IE comprising the ID of a 'UL-PathlossReferenceRS' IE with an UL channel or RS or resource, the UE may perform the transmission of the same with the spatial relation provided in the UL-TCI IE and the pathloss reference provided in the 'UL-PathlossReferenceRS' IE indicated by the UL-TCI IE.

On the other hand, if the UE receives a signaling that associates a 'UL-PathlossReferenceRS' IE comprising the ID of a UL-TCI IE with an UL channel or RS or resource, the UE may perform the transmission of the same with the pathloss reference provided in the 'UL-PathlossReferenceRS' IE and the spatial relation provided in the UL-TCI IE indicated by the 'UL-PathlossReferenceRS' IE.

Port Indication Via Higher Layer Information Elements

In accordance with some embodiments, the UE is configured to obtain an UL-TCI IE that may provide an indication of the port(s), or the port(s) for an uplink transmission. The UL-TCI IE may be referred to provide the port(s) of transmission for at least one PUCCH resource/resource group and/or PUSCH and/or an SRS resource/resource set. The reference to an UL-TCI information element to provide the port(s) for an uplink transmission may be made via RRC, a MAC-CE message or via the PHY-layer using the downlink control information (DCI) contained in a PDCCH.

In another embodiment, a separate IE may be configured to indicate the port(s) to be used for an uplink transmission and it may be associated with an UL-TCI information element via a higher layer or the PHY-layer.

In accordance with some embodiment, the UE is configured to obtain from a network node via a higher layer, an IE, which provides the port(s) for an uplink transmission. The information element may be referred to provide the port(s) of transmission for at least a PUCCH resource and/or PUSCH and/or an SRS resource/resource set. The IE may comprise at least the following: an ID unique for each IE, a parameter providing the number of ports or a parameter providing the identifier(s) or index/indices of one or more ports. Depending on the indication method, the UE may select the ports for an uplink transmission.

For example, if the IE provides the port indices [0,1,2,3] for transmission, the UE may select 4 ports for transmission from the P≥4 ports that is capable of transmission from. Similarly, if the IE provides $P_i$ ports for transmission, the UE selects $P_i \leq P$ ports from the P ports it is capable of transmitting from. The information element may be titled 'UL-PortIndication', for example.

The selection of the ports, with respect to any method of port indication in this disclosure, according to the indices or the indicated number of ports, i.e., the mapping of the indicated port indices or number of ports, to the ports at the UE may be predetermined in the NR specifications, indicated via a higher layer or decided by the UE.

In accordance with some embodiments, the UE is provided with an association of an UL-PortIndication IE and an UL-TCI IE that provides one or more of the following for an uplink transmission: a spatial filter reference, a pathloss reference, a power control setting comprising one or more power control parameters. The association may be performed via a higher layer (RRC or MAC layer, for example) or the PHY-layer, or it is fixed and known in the NR specification(s). The combined setting defined by the association between a UL-PortIndication IE and an UL-TCI IE may be used to provide the transmission settings for an uplink transmission of at least one PUCCH resource/resource group and/or PUSCH and/or SRS resource/resource set. For example, a MAC-CE message comprising at least the following may be received by the UE: the ID of at least one UL-TCI IE, the ID of at least one UL-PortIndication IE. In another example, a higher layer information element may provide the association by indicating the identifier(s) of the UL-TCI IE(s) and the UL-PortIndication IE(s) that are associated.

Down-Selection and Activation of UL-TCI States

In accordance with embodiments, the UE is configured to obtain from a network node via a higher layer, a configuration of $1 \leq N \leq N_{max}$ UL-TCI information elements (IEs). The UE may additionally receive, one or more MAC-CE messages from the network node, wherein S≤N UL-TCI states are selected from the N configured UL-TCI states.

It is to be noted that an UL-TCI configuration or an UL-TCI IE provided to the UE via a higher layer may also be denoted in this disclosure as an 'UL-TCI state'.

In accordance with an embodiment, the UE is configured to obtain from a network node via a DCI contained in a PDCCH, an indication of one or more of the N configured UL-TCI states or one or more of S UL-TCI states selected via a MAC-CE message for the uplink transmission of a PUSCH or PUCCH resource(s) or SRS resource(s)/resource set(s). The UL-TCI state may indicate a spatial relation setting and/or a pathloss reference RS setting and/or a UL power control setting providing one or more power control parameters and/or the port(s) to be used for an uplink transmission. For example, the DCI may comprise a K≥1 bit field that indicates one or more of the N UL-TCI IE(s) configured via a higher layer or one or more of the S≤N UL-TCI IE(s) selected via a MAC-CE message for the uplink transmission of at least one PUCCH resource/resource group and/or PUSCH and/or SRS resource/resource set.

Figure 2:
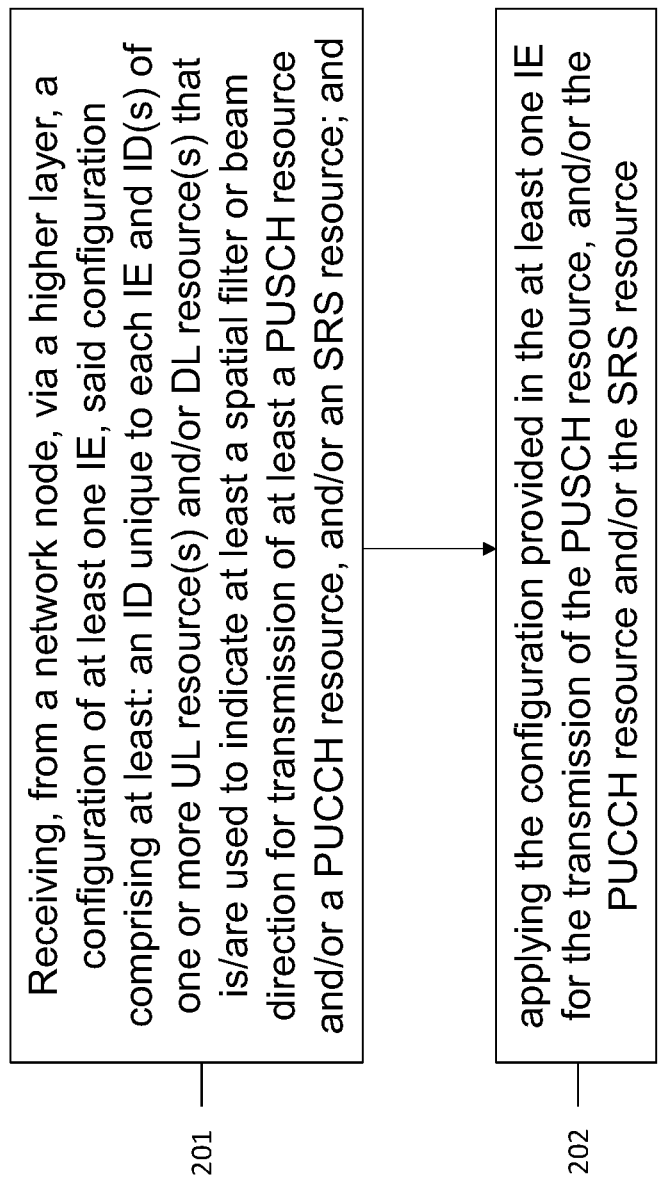
FIG. 2 illustrates a flowchart of a method performed by a UE according to some embodiments.

Referring to FIG. 2, there is provided a method performed by a UE, summarizing some of the embodiments previously described: As shown, the method comprises:

(201) receiving, from a network node, via a higher layer, a configuration of at least one IE, said configuration comprising at least: an ID unique to each IE and ID(s) of one or more UL resource(s) and/or DL resource(s) that is/are used to indicate at least a spatial filter or beam direction for transmission of at least a PUSCH, resource and/or a PUCCH, resource, and/or a resource; and (202) applying the configuration provided in the at least one IE for the transmission of the PUSCH resource, and/or the PUCCH resource and/or the SRS resource.

As previously described, according to an embodiment, if the DL resource is a NZP CSI-RS resource, the method comprises, transmitting the PUCCH resource or the SRS resource or the PUSCH resource with the same spatial filter or beam direction used for reception of the NZP CSI-RS;

if the DL resource is a SS-PBCH, the method comprises, transmitting the PUCCH resource or the SRS resource or the PUSCH resource with the same spatial filter or beam direction used for reception of the SS-PBCH;

if the UL resource is an SRS resource, the method comprises, transmitting the PUCCH resource, or the SRS resource, or the PUSCH resource with the same spatial filter or beam direction used for the transmission of the SRS resource;

if the DL resource is a CORESET, the method comprises, transmitting the PUCCH resource, or the SRS resource, or the PUSCH resource with the same spatial filter or beam direction used for the reception of one or more PDCCH(s) on said CORESET.

The method further comprises:
receiving from the network node, via a higher layer, an association of an UL-TCI IE, with at least one SRS resource, or at least one SRS resource set, or at least one PUCCH resource, or at least one PUCCH resource group or a PUSCH; and applying the spatial filter or beam direction provided in the at least one IE to at least one of the indicated SRS resource(s) and/or SRS resource(s) in the SRS resource set(s) and/or PUCCH resource(s) and/or PUCCH resource(s) in the indicated resource group(s) and/or PUSCH or at least one uplink transmission on an indicated UL BWP.

The method, performed by the UE, further comprises, applying one or more DL and/or UL resource(s) contained in the UL-TCI IE as a reference for the derivation of a pathloss factor as a pathloss reference for the transmission of at least a PUSCH, a PUCCH resource or an SRS resource, and wherein the pathloss factor is used to obtain a transmit power for said PUSCH, PUCCH resource, SRS resource or the SRS resource(s) in said SRS resource set.

If the pathloss factor for an UL transmission of the PUCCH, SRS or PUSCH is derived from a CORESET, the method comprises, obtaining the pathloss factor from one of DL reference signals that provides Quasi-Co-Location, QCL, assumptions for the reception of at least one of the PDCCH(s) on the CORESET.

If the pathloss reference for an UL transmission of a PUCCH, SRS or PUSCH is obtained from an UL RS resource set, such as an SRS resource set, the method comprises, obtaining the pathloss factor from a DL RS that is used as a pathloss reference RS and/or as a spatial relation for said SRS resource set or one or more RS resources in the SRS resource set.

If the pathloss reference for an UL transmission of the PUCCH, SRS or PUSCH is obtained from an UL RS, the method comprises, obtaining the pathloss factor from a DL RS that is used as a pathloss reference RS and/or as a spatial relation for said uplink RS resource or an uplink RS resource set comprising the uplink RS resource.

As previously described, the IE (e.g. the UL-TCI IE) comprises an indication or a parameter indicating whether a DL resource or a UL resource indicated is to be used to derive an UL spatial filter only, or is a reference for a derivation of a pathloss factor only, or to be used to derive the spatial filter and as a reference for the derivation of the pathloss factor for an UL transmission.

The configuration of the IE further comprises one or more power settings to be used in the UL transmission, and wherein the IE further contains one or more of the following parameters:
one or more indications comprising whether one or more resources(s) indicated in the IE is/are to be used to derive an UL spatial filter or beam direction and/or to be used as a reference for the derivation of a pathloss factor, i.e., used as a pathloss reference for an UL transmission;
an indication of one or more of the following power control parameters for the UL transmission: a closes loop power control index, a value p0 or an indication to an IE with the p0 value, an alpha value or an indication to an IE with an alpha value, wherein p0 and alpha are used for the calculation of the UL transmission power.

The method further comprises, obtaining, from the network node, an UL-TCI IE that provides an indication of at least one port for an UL transmission for at least one PUCCH resource or PUCCH resource group and/or PUSCH and/or an SRS resource or SRS resource set, and wherein a reference to the UL-TCI IE is obtained via RRC, a MAC-CE message or via a PHY-layer using a downlink control information, DCI, contained in a PDCCH.

As previously described, the method comprises, obtaining from the network node, via a higher layer, a configuration of $1 \leq N \leq N_{max}$ UL-TCI IEs.

The method further comprises, receiving one or more MAC-CE messages, from the network node, wherein S≤N UL-TCI states are selected from the N configured UL-TCI states The method further comprises, receiving, from the network node, via a DCI contained in a PDCCH, an indication of one or more of the N configured UL-TCI states or one or more of said S UL-TCI states selected via e.g. the MAC-CE message for the UL transmission of a PUSCH or PUCCH resource(s) or SRS resource(s) or SRS resource set(s).

Figure 3:
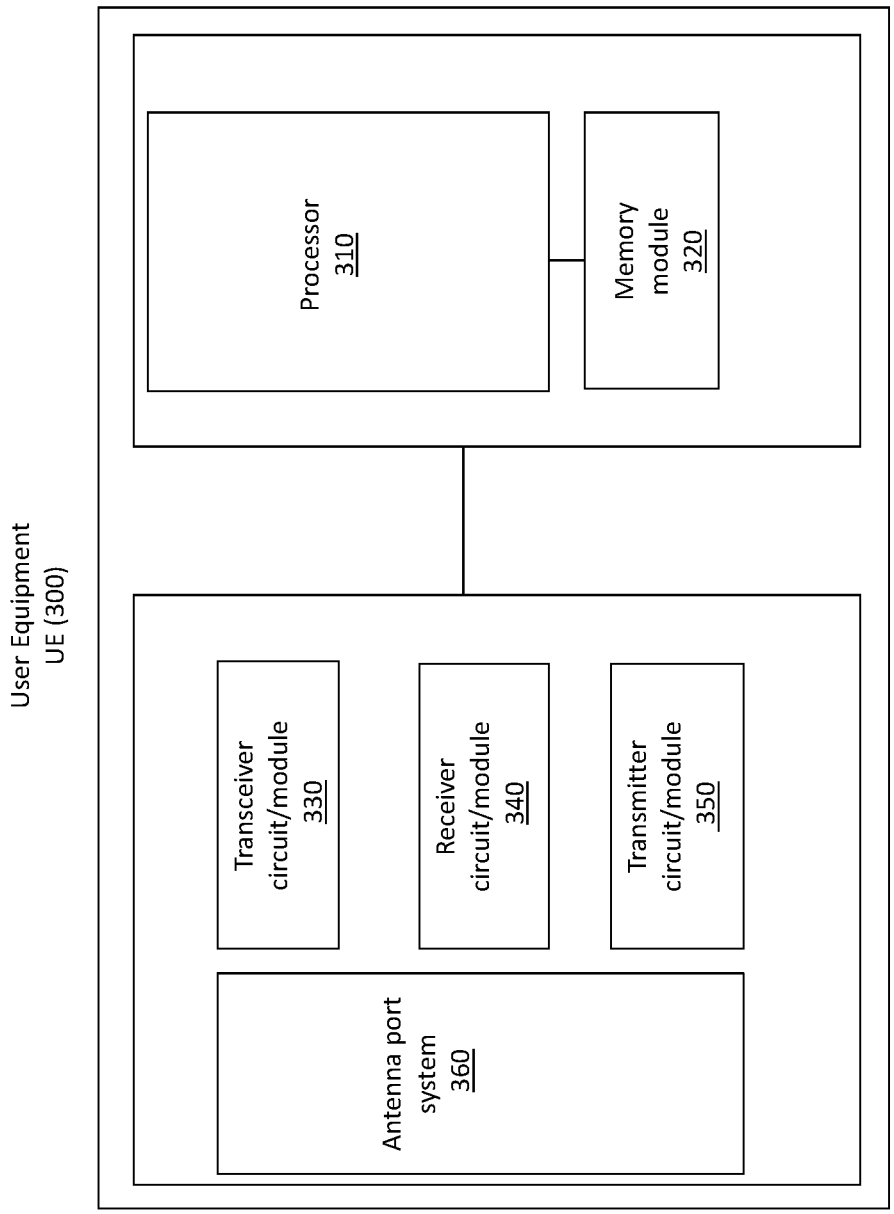
FIG. 3 illustrates a flowchart of a method performed by a network node according to some embodiments.

In order to perform the previously described process or method steps performed by the UE there is also provided a UE. FIG. 3 illustrates a block diagram depicting a UE 300. The UE 300 comprises a processor 310 or processing circuit or a processing module or a processor or means 310; a receiver circuit or receiver module 340; a transmitter circuit or transmitter module 350; a memory module 320, a transceiver circuit or transceiver module 330 which may include the transmitter circuit 350 and the receiver circuit 340. The UE 300 further comprises an antenna system 360 which includes antenna circuitry for transmitting and receiving signals to/from at least the network node. The antenna system employs beamforming as previously described. The actions performed by the UE have already been described.

The UE 300 may belong to any radio access technology including 4G or LTE, LTE-A, 5G, advanced 5G or a combination thereof that support beamforming technology. The UE comprising the processor and the memory contains instructions executable by the processor, whereby the UE 300 is operative or is configured to perform any one of the embodiments related to the UE previously described.

The processing module/circuit 310 includes a processor, microprocessor, an application specific integrated circuit (ASIC), field programmable gate array (FPGA), or the like, and may be referred to as the "processor." The processor 310 controls the operation of the network node and its components. Memory (circuit or module) 320 includes a random-access memory (RAM), a read only memory (ROM), and/or another type of memory to store data and instructions that may be used by processor 310. In general, it will be understood that the network node in one or more embodiments includes fixed or programmed circuitry that is configured to carry out the operations in any of the embodiments disclosed herein.

In at least one such example, the processor 310 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure relating to the UE. Further, it will be appreciated that the UE 300 may comprise additional components.

Figure 4:
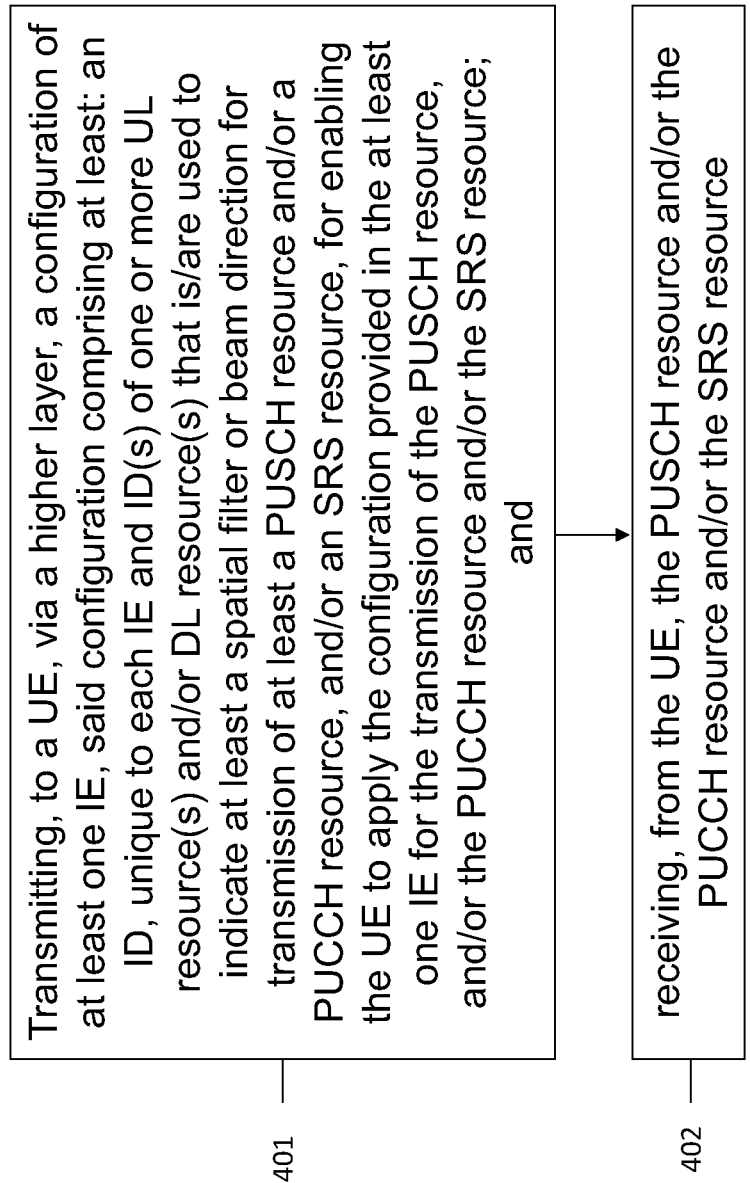
FIG. 4 illustrates a block diagram depicting a UE according to some embodiments herein.

Referring to FIG. 4, there is provided a method performed by a network node or gNB according to some embodiments previously described: As shown, the method comprises:
- (401) transmitting, to a UE, via a higher layer, a configuration of at least one IE, said configuration comprising at least: an ID, unique to each IE and ID(s) of one or more UL resource(s) and/or DL resource(s) that is/are used to indicate at least a spatial filter or beam direction for transmission of at least a PUSCH resource and/or a PUCCH resource, and/or a SRS resource; for enabling the UE to apply the configuration provided in the at least one IE for the transmission of the PUSCH resource, and/or the PUCCH resource and/or the SRS resource; and
- receiving (402), from the UE, the PUSCH resource and/or the PUCCH resource and/or the SRS resource, i.e. after that the UE applies the configuration as described above.

Additional actions performed by the network node have already been described.

Figure 5:
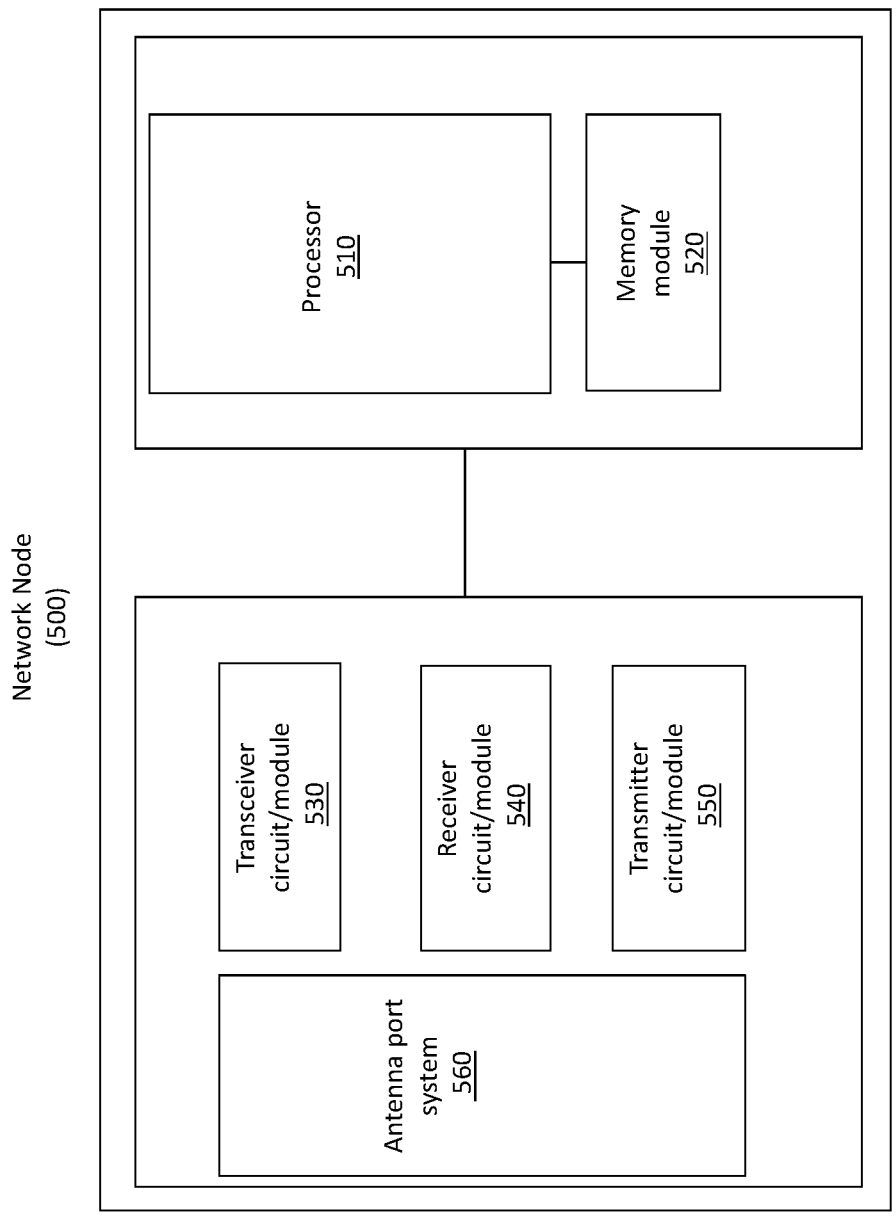
FIG. 5 illustrates a block diagram depicting a network node according to some embodiments.

In order to perform the previously described process or method steps performed by the network node, there is also provided a network node (or gNB). FIG. 5 illustrates an exemplary block diagram of a network node 500. The network node 500 comprises a processor 510 or processing circuit or a processing module or a processor or means 510; a receiver circuit or receiver module 540; a transmitter circuit or transmitter module 550; a memory module 520, a transceiver circuit or transceiver module 530 which may include the transmitter circuit 550 and the receiver circuit 540. The network node 500 further comprises an antenna system 560 which includes antenna circuitry for transmitting and receiving signals to/from at least the UE. The antenna system 560 employs beamforming as previously described. The actions performed by the network node 500 have already been described. The network node 500 may also be viewed as a Transmission and Reception Point (TRP).

The processing module/circuit 510 includes a processor, microprocessor, an application specific integrated circuit (ASIC), field programmable gate array (FPGA), or the like, and may be referred to as the "processor." The processor 510 controls the operation of the network node and its components. Memory (circuit or module) 520 includes a random-access memory (RAM), a read only memory (ROM), and/or another type of memory to store data and instructions that may be used by processor 510. In general, it will be understood that the network node in one or more embodiments includes fixed or programmed circuitry that is configured to carry out the operations in any of the embodiments disclosed herein.

In at least one such example, the processor 510 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node 500 may comprise additional components.

The network node 500 may belong to any radio access technology including 4G or LTE, LTE-A, 5G, advanced 5G or a combination thereof that support beamforming technology. The network node 500 comprising the processor and the memory contains instructions executable by the processor, whereby the network node 500 is operative or is configured to perform any one of the subject-matter presented in this disclosure related to the network node (or gNB).

Several advantages of the described embodiments in this disclosure are achieved, which include:

Reduction in higher layer control information overhead and latency and enhancing dynamic indication of beam settings for uplink beam management;

A joint framework for SRS, PUCCH and PUSCH for spatial filter or beam direction, pathloss reference RS, port indication etc. to streamline beam indication and reduce redundancies in control information across various channel(s) and RS(s) in the uplink.

The definition of UL TCI IE(s) for uplink spatial filter/beam indication provides a unified setting for UEs with reduced beamforming capabilities while also improving the flexibility of beam management for UEs with multi-beam capabilities.

Separation of pathloss reference indication and spatial filtering for UL transmission including different embodiments or schemes to provide flexibility for the different capabilities and requirements at the UE side for the application of the two settings or configurations.

Different schemes or embodiments for port indication used for the UL transmission to align downlink reception and transmission.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including LTE or 4G, LTE-A (or LTE-Advanced), 5G, advanced 5G, WiMAX, WiFi, satellite communications, TV broadcasting etc.

REFERENCES

[1] 3GPP TS 38.211 V16.0.0: "3GPP; TSG RAN; NR; Physical channels and modulation (Rel. 16)," January 2020.

[2] 3GPP TS 38.212 V16.0.0: "3GPP; TSG RAN; NR; Multiplexing and channel coding (Rel. 16)," January 2020.

[3] 3GPP TS 38.213 V16.0.0: "3GPP; TSG RAN; NR; Physical layer procedures for control (Rel. 16)," January 2020.

[4] 3GPP TS 38.214 V16.0.0: "3GPP; TSG RAN; NR; Physical layer procedures for data (Rel. 16)," January 2020.

[5] 3GPP TS 38.321 V15.8.0: "3GPP; TSG RAN; NR; Medium Access Control (MAC) protocol specification (Rel. 15)," January 2020.

[6] 3GPP TS 38.331 V15.8.0: "3GPP; TSG RAN; NR; Radio Resource Control (RRC); Protocol specification (Rel. 15)," January 2020.

[7] 3GPP TS 38.101-1 V16.2.0: "3GPP; TSG RAN; User Equipment (UE) radio transmission and reception; Part 1: Range 1 Standalone (Rel. 16)," January 2020.

[8] 3GPP TS 38.101-2 V16.2.0: "3GPP; TSG RAN; User Equipment (UE) radio transmission and reception; Part 2: Range 2 Standalone (Rel. 16)," January 2020.

The invention claimed is:

1. A method performed by a User Equipment (UE), the method comprising:
   receiving, from a network node, via a higher layer, a configuration of at least one information element (IE) being an Uplink Transmission Configuration Indication (UL-TCI) IE, said configuration comprising at least: an identifier (ID) unique to each IE and IDs of one or more uplink (UL) resources and/or downlink (DL) resources that are used to indicate at least a spatial relation for the transmission of at least a Physical Uplink Shared Channel (PUSCH) resource, a Physical Uplink Control Channel (PUCCH) resource and/or a Sounding Reference Signal (SRS) resource;
   receiving from the network node, via the higher layer, a configuration of at least one IE, 'UL-PathlossReferenceRS', comprising at least: an ID unique to each IE and IDs of one or more UL and/or DL RS resources that are used to indicate pathloss reference RSs for the derivation of a pathloss factor for the transmission of at least a PUSCH, a PUCCH resource, and/or an SRS resource, wherein the pathloss factor is used to obtain a transmit power for the at least one PUSCH, PUCCH resource and/or SRS resource, and wherein the UL and/or DL resource is one of the following: a Channel State Information Reference Signal (CSI-RS) resource, an SRS, resource, a Synchronization Signal Block, SSB, or a Control Resource Set (CORESET) wherein the UL-TCI IE comprises the ID of the 'UL-PathlossReferenceRS' IE; and
   applying the configuration provided in the at least one UL-TCI IE for the transmission of the at least one PUSCH resource, the PUCCH resource and/or the SRS resource.

2. The method according to claim 1, further comprising obtaining from the network node, via a higher layer, a configuration of $1 \leq N \leq N_{max}$ UL-TCI IEs.

3. The method according to claim 2, further comprising receiving one or more Medium Access Control-Control Element (MAC-CE) messages, from the network node, wherein S≤N UL-TCI states are selected from the N configured UL-TCI states.

4. The method according to claim 3, further comprising receiving from the network node, via a Downlink Control Information (DCI) contained in a Physical Downlink Control Channel (PDCCH) an indication of one or more of the N configured UL-TCI states or one or more of said S UL-TCI states selected via the MAC-CE message for the UL transmission of at least one PUSCH and PUCCH resources or SRS resources or SRS resource sets.

5. The method according to claim 1, wherein if the pathloss factor for an UL transmission of the PUCCH, SRS or PUSCH is derived from a CORESET, further comprising obtaining the pathloss factor from one of DL reference signals that provides Quasi-Co-Location (QCL) assumptions for the reception of at least one PDCCHs on the CORESET.

6. The method according to claim 1, wherein if a pathloss reference for an UL transmission of a PUCCH, SRS or PUSCH is obtained from an UL RS resource set, such as an SRS resource set, further comprising obtaining the pathloss factor from a DL RS that is used as a pathloss reference RS and/or spatial relation for said SRS resource set or one or more RS resources in the SRS resource set.

7. The method according to claim 1, wherein if a pathloss reference for an UL transmission of the PUCCH, SRS or PUSCH is obtained from an UL reference signal (RS), further comprising obtaining the pathloss factor from a DL RS that is used as a pathloss reference RS and/or a spatial relation for said uplink RS resource or an uplink RS resource set comprising the uplink RS resource.

8. The method according to claim 1, wherein the pathloss factor is used to refer to a pathloss estimate calculated from a reference signal or resource, and/or to a downlink pathloss estimate value $PL_{b,f,c}(q_d)$ calculated by the UE in an UL Bandwidth part (BWP) b, a carrier f and a cell c, using reference signal (RS) with index $q_d$ that is pre-determined.

9. The method according to claim 1, wherein the UE is configured to compute/derive the pathloss factor for an uplink transmission of a PUCCH, SRS or PUSCH from a downlink reference signal resource that is used as a pathloss reference RS as follows: the pathloss factor in subcarrier f in serving cell c is computed from an indicated pathloss reference RS $q_d$ as $PL_{f,c}(q_d)$=ReferenceSignalPower-RSRP, where RSRP is a higher layer filtered reference signal received power and the ReferenceSignalPower is the transmit power of said pathloss reference RS which is provided by higher layers or is pre-determined.

10. The method according to claim 1, wherein the UE is configured to receive from a network node, via a higher layer, an association of an UL-TCI IE with at least one SRS resource or SRS resource set or PUCCH resource or PUCCH resource group or PUSCH via a MAC-CE message that comprises at least the following: the ID of at least one UL-TCI IE, and one or more of the following:
   the IDs of one or more SRS resources;
   the IDs of one or more SRS resource sets;
   the IDs of one or more PUCCH resources;
   the IDs of one or more PUCCH resource groups, or
   the IDs of one or more uplink bandwidth parts (BWPs),
   wherein after the reception of the MAC-CE message, the UE applies the spatial relation and/or pathloss reference RS and/or power control settings provided in the at least one information element to at least one of the indicated SRS resources and/or SRS resources in the indicated SRS resource sets and/or PUCCH resources and/or PUCCH resources in the indicated PUCCH resource groups and/or PUSCH or at least one uplink transmission on an indicated UL BWP.

11. A User Equipment (UE) comprising a processor and a memory containing instructions executable by the processor, whereby said UE is operative to:
   receive, from a network node, via a higher layer, a configuration of at least one information element (IE) being an Uplink Transmission Configuration Indication (UL-TCI) IE, said configuration comprising at least: an identifier (ID) unique to each IE and IDs of one or more uplink (UL) resources and/or downlink (DL) resources that are used to indicate at least a spatial relation for the transmission of at least a Physical Uplink Shared Channel (PUSCH) resource, a Physical Uplink Control Channel (PUCCH) resource and/or a Sounding Reference Signal (SRS) resource;
   receive, from the network node, via the higher layer, a configuration of at least one IE, 'UL-PathlossReferenceRS', comprising at least: an ID unique to each IE and ID(s) of one or more UL and/or DL RS resource(s) that are used to indicate pathloss reference RSs for the derivation of a pathloss factor for the transmission of at least a PUSCH, a PUCCH resource, and/or an SRS resource, wherein the pathloss factor is used to obtain a transmit power for the at least one PUSCH, PUCCH resource and/or SRS resource, and wherein the UL and/or DL resource is one of the following: a Channel State Information Reference Signal (CSI-RS) resource, an SRS resource, a Synchronization Signal Block (SSB) or a Control Resource Set (CORESET), wherein the UL-TCI IE comprises the ID of the 'UL-PathlossReferenceRS' IE; and apply the configuration provided in the at least one UL-TCI IE for the transmission of the at least one PUSCH resource, the PUCCH resource and/or the SRS resource.

12. A method performed by a network node, the method comprising:

transmitting, to a User Equipment (UE), via a higher layer, a configuration of at least one information element (IE) being an Uplink Transmission Configuration (UL-TCI IE), said configuration comprising at least: an identifier (ID) unique to each IE and IDs of one or more uplink (UL) resources and/or downlink (DL) resources that are used to indicate at least a spatial relation for the transmission of at least a Physical Uplink Shared Channel (PUSCH) resource, a Physical Uplink Control Channel (PUCCH) resource and/or a Sounding Reference Signal (SRS) resource;

transmitting to the UE, via the higher layer, a configuration of at least one IE, 'UL-PathlossReferenceRS', comprising at least: an ID unique to each IE and ID(s) of one or more UL and/or DL RS resources that are used by the UE to indicate pathloss reference RSs for the derivation of a pathloss factor for the transmission of at least a PUSCH resource, a PUCCH resource, and/or a SRS resource;

wherein the pathloss factor is used to obtain a transmit power for the at least one PUSCH, PUCCH resource and/or SRS resource, for enabling the UE to apply the configuration provided in the at least one UL-TCI IE for the transmission of the PUSCH resource, the PUCCH resource and/or the SRS resource, wherein the UL and/or DL resource is one of the following: a Channel State Information Reference Signal (CSI-RS) resource, an SRS resource, a Synchronization Signal Block (SSB), or a Control Resource Set (CORESET), and wherein the UL-TCI IE comprises the ID of the 'UL-PathlossReferenceRS' IE, for enabling the UE to apply the configuration provided in the at least one UL-TCI IE for the transmission of the at least one PUSCH resource, the PUCCH resource, and/or the SRS resource and receiving, from the UE, the at least one PUSCH resource, the PUCCH resource and/or the SRS resource.

13. A network node, comprising a processor and a memory containing instructions executable by the processor, whereby said network node is operative to:

transmit, to a User Equipment (UE), via a higher layer, a configuration of at least one information element (IE) being an Uplink Transmission Configuration (UL-TCI IE), said configuration comprising at least: an identifier (ID) unique to each IE and IDs of one or more uplink (UL) resources and/or downlink (DL) resources that are used to indicate at least a spatial relation for the transmission of at least a Physical Uplink Shared Channel (PUSCH) resource, a Physical Uplink Control Channel (PUCCH) resource and a Sounding Reference Signal (SRS) resource;

transmit, to the UE, via the higher layer, a configuration of at least one IE, 'UL-PathlossReferenceRS', comprising at least: an ID unique to each IE and ID(s) of one or more UL and/or DL RS resources that are used by the UE as a to indicate pathloss reference RSs for the derivation of a pathloss factor for the transmission of at least a PUSCH resource, a PUCCH resource, and/or a SRS resource;

wherein the pathloss factor is used to obtain a transmit power for the at least one PUSCH, PUCCH resource, and/or SRS resource, and wherein the UL and/or DL resource is one of the following: a Channel State Information Reference Signal, CSI-RS, resource, an SRS, resource, a Synchronization Signal Block, SSB, or a Control Resource Set, CORESET, and wherein the UL-TCI IE comprises the ID of the 'UL-PathlossReferenceRS' IE, for enabling the UE to apply the configuration provided in the at least one UL-TCI IE for the transmission of the at least one PUSCH resource, the PUCCH resource, and/or the SRS resource; and receive, from the UE, the at least one PUSCH resource, the PUCCH resource, and/or the SRS resource.

* * * * *